(12) United States Patent
Kato et al.

(10) Patent No.: US 8,565,953 B2
(45) Date of Patent: *Oct. 22, 2013

(54) HYBRID VEHICLE AND METHOD FOR CONTROLLING THE SAME

(75) Inventors: Norihiko Kato, Handa (JP); Masaya Yamamoto, Kasugai (JP); Haruki Sato, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/259,445

(22) PCT Filed: Jun. 10, 2009

(86) PCT No.: PCT/JP2009/060589
§ 371 (c)(1),
(2), (4) Date: Sep. 23, 2011

(87) PCT Pub. No.: WO2010/143278
PCT Pub. Date: Dec. 16, 2010

(65) Prior Publication Data
US 2012/0010771 A1 Jan. 12, 2012

(51) Int. Cl.
*B60L 9/00* (2006.01)
(52) U.S. Cl.
USPC ............ 701/22; 701/54; 701/36; 701/41; 701/63; 320/109; 320/104; 320/103; 320/101; 307/9.1; 307/82; 307/31; 307/104
(58) Field of Classification Search
USPC .......... 180/65.21, 62.265, 65.245, 65.25, 180/65.23, 65.28, 65.29; 701/22, 54; 903/930, 904, 907, 906, 905
See application file for complete search history.

(56) References Cited

U.S. PATENT DOCUMENTS 6,047,787 A * 4/2000 Deng et al. ............... 180/165
6,606,553 B2 8/2003 Zobell et al.
(Continued)

FOREIGN PATENT DOCUMENTS

| CN | 101253089 A | 8/2008 |
| EP | 1920985 A1 | 5/2008 |

(Continued)

OTHER PUBLICATIONS

International Search Report mailed Jul. 21, 2009 of PCT/JP2009/060589.

(Continued)

*Primary Examiner* — Tuan C. To
*Assistant Examiner* — Jelani Smith
(74) *Attorney, Agent, or Firm* — Kenyon & Kenyon LLP

(57) ABSTRACT

A power supply system includes a main power storage device and a plurality of sub power storage devices. A converter is connected to a selected one of the sub power storage devices to convert voltage between the selected sub power storage device and an electric power feeding line bidirectionally. The sub power storage device undergoes a connection switching process, and when the last sub power storage device is currently used, then, in accordance with that sub power storage device's SOC and the vehicle's state, a request is generated to disconnect the sub power storage device and a relay is turned off. In doing so, if a process is currently performed for starting or stopping an engine, generating the request is refrained even if a decreased SOC is sensed. Similarly, if a process is performed to disconnect a sub power storage device, and therewhile a request is generated to start/stop the engine, starting the process performed for starting or stopping the engine is refrained.

12 Claims, 10 Drawing Sheets

(56) References Cited

U.S. PATENT DOCUMENTS

| | | | |
|---|---|---|---|
| 6,608,396 B2* | 8/2003 | Downer et al. | 290/40 C |
| 8,004,109 B2* | 8/2011 | Komatsu | 307/9.1 |
| 2003/0107352 A1* | 6/2003 | Downer et al. | 322/40 |
| 2003/0139859 A1 | 7/2003 | Hanada et al. | |
| 2007/0247106 A1* | 10/2007 | Kawahara et al. | 320/104 |
| 2008/0185197 A1* | 8/2008 | Nakamura et al. | 180/65.2 |
| 2009/0058326 A1 | 3/2009 | Oyobe et al. | |
| 2009/0277701 A1 | 11/2009 | Soma et al. | |
| 2010/0038962 A1 | 2/2010 | Komatsu | |
| 2010/0096918 A1 | 4/2010 | Sawada et al. | |
| 2010/0121507 A1 | 5/2010 | Ishii et al. | |
| 2011/0040436 A1 | 2/2011 | Yamamoto et al. | |
| 2011/0066311 A1 | 3/2011 | Itagaki | |
| 2011/0087395 A1 | 4/2011 | Yamamoto et al. | |
| 2011/0178664 A1 | 7/2011 | Yamamoto et al. | |
| 2011/0208383 A1 | 8/2011 | Yamamoto et al. | |
| 2011/0251745 A1 | 10/2011 | Yamamoto et al. | |
| 2011/0257825 A1 | 10/2011 | Yamamoto et al. | |
| 2012/0010771 A1 | 1/2012 | Kato et al. | |
| 2012/0016549 A1* | 1/2012 | Katsumata et al. | 701/22 |
| 2012/0022738 A1 | 1/2012 | Kato et al. | |
| 2012/0089290 A1 | 4/2012 | Kato et al. | |

FOREIGN PATENT DOCUMENTS

| | | |
|---|---|---|
| JP | 2003-209969 A | 7/2003 |
| JP | 2004-359032 A | 12/2004 |
| JP | 2006-077641 A | 3/2006 |
| JP | 2007-062589 A | 3/2007 |
| JP | 2007-062639 A | 3/2007 |
| JP | 2007-098981 A | 4/2007 |
| JP | 2007-269249 A | 10/2007 |
| JP | 2007-282375 A | 10/2007 |
| JP | 2008-109840 A | 5/2008 |
| JP | 2008-154439 A | 7/2008 |
| JP | 2008-167620 A | 7/2008 |
| JP | 2008-220084 A | 9/2008 |

OTHER PUBLICATIONS

Notice of Allowance issued Nov. 28, 2012 for U.S. Appl. No. 13/003,727.

USPTO, Office Action in U.S. Appl. No. 13/003,727, dated Apr. 26, 2012.

USPTO, Office Action in U.S. Appl. No. 13/003,727, dated Sep. 11, 2012.

Notice of Allowance issued on May 14, 2013 in U.S. Appl. No. 13/126,403.

Supplemental Notice of Allowance issued on Jul. 9, 2013 in U.S. Appl. No. 13/126,403.

Notice of Allowance issued on Jun. 25, 2013 in U.S. Appl. No. 13/003,727.

* cited by examiner

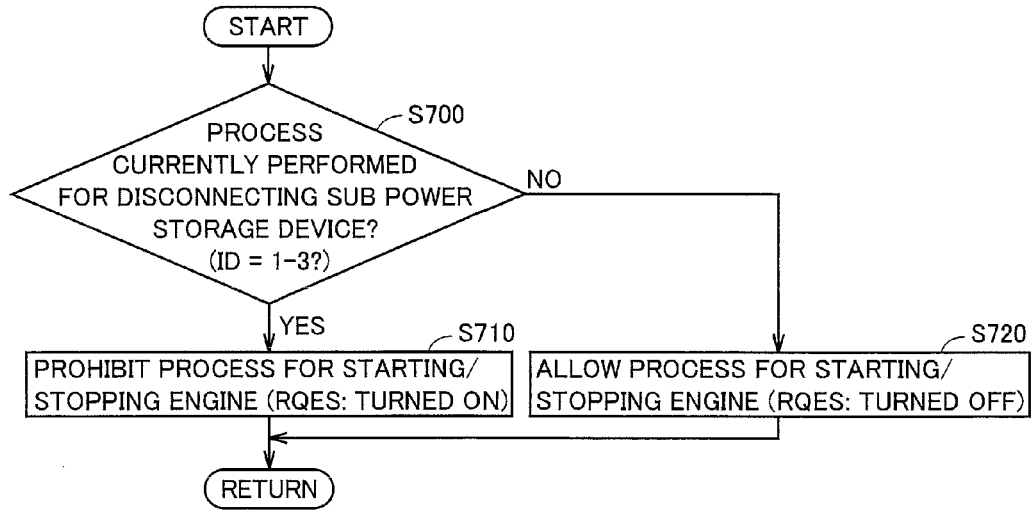
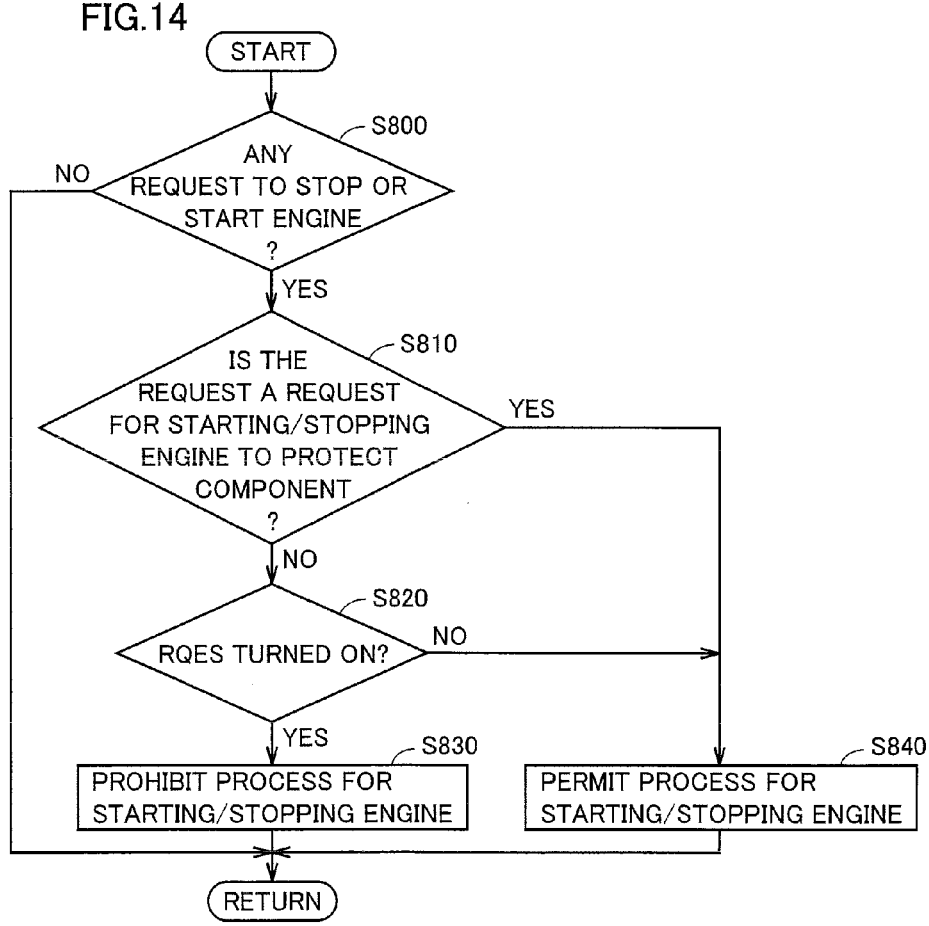

HYBRID VEHICLE AND METHOD FOR CONTROLLING THE SAME

This is a 371 national phase application of PCT/JP2009/060589 filed 10 Jun. 2009, the contents of which are incorporated herein by reference.

TECHNICAL FIELD

The present invention relates generally to hybrid vehicles and methods of controlling the same, and particularly to controlling a power supply system of a hybrid vehicle having a main power storage device and a plurality of sub power storage devices mounted therein.

BACKGROUND ART

In recent years as an environmentally friendly vehicle hybrid vehicles have been developed into practical use. A hybrid vehicle has mounted therein an internal combustion engine as a normal vehicular power source, and in addition thereto an electric motor generating force to drive the vehicle, and a power supply system for supplying electric power to drive the motor. The power supply system includes a power storage device.

For hybrid vehicles, there has been proposed a configuration charging a vehicle-mounted power storage device by a power supply external to the vehicle (hereinafter also referred to as an "external power supply"), and accordingly, there is a demand for increased distances travelable on electric power stored in the vehicle-mounted power storage device. Hereinafter, charging a vehicle-mounted power storage device by an external power supply will also simply be referred to as "external charging".

For example, Japanese Patent Laying-Open No. 2008-109840 (PTL 1) describes a power supply system having a plurality of power storage devices (batteries) connected in parallel. The power supply system described in PTL 1 is provided with a voltage converter (a converter) for each power storage device (or battery) as a charging/discharging adjustment mechanism. In contrast, Japanese Patent Laying-Open No. 2008-167620 (PTL 2) describes a power supply device in a vehicle having a main power storage device and a plurality of sub power storage devices mounted therein, that provides a converter associated with the main power storage device and a converter shared by the plurality of sub power storage devices. This configuration can achieve a reduced number of converters and also an increased storable amount of energy.

In particular, the configuration described in PTL 2 has one of the plurality of sub power storage devices selectively connected to the converter to allow the main power storage device and the selected sub power storage device to supply electric power to drive an electric motor for driving a vehicle. In the power supply device when the sub power storage device in use has a decreased state of charge (SOC) a different sub power storage device is connected to the converter to use the plurality of sub power storage devices sequentially to allow stored electric energy to be used to achieve increased electric vehicle (EV) travelable distance.

CITATION LIST

Patent Literature

PTL 1: Japanese Patent Laying-Open No. 2008-109840
PTL 2: Japanese Patent Laying-Open No. 2008-167620

SUMMARY OF INVENTION

Technical Problem

In the power supply system described in PTL 2, when all of the sub power storage devices have completely used their stored electricity, positively, electrically disconnecting all of the sub power storage devices from the converter can be expected to allow the power supply system to be subsequently controlled with an increased degree of freedom.

Furthermore, for a hybrid vehicle, traveling depending solely on an output of a motor and that depending on both the output of the motor and that of an engine are selected depending on how the vehicle travels. Accordingly, the engine is operated intermittently as a process is performed to start or stop it while the vehicle is traveling.

When the engine starts/stops, a request is generated to charge/discharge the power supply system. More specifically, to start the engine, the engine is cranked, and to do so, the motor's electric power is output from the power supply system. In stopping the engine, the power supply system receives/outputs the motor's electric power for controlling speed reduction by driving the motor after cutting fuel, and for using regenerative braking immediately before stopping, so as to reduce vibration.

As such, if a disconnection process that accompanies the end of using the last sub power storage device in the power supply system, and starting/stopping the engine are done concurrently, vehicular driving power that can be generated varies, and drivability may be affected.

The present invention has been made to overcome such disadvantage and it contemplates preventing a hybrid vehicle that includes a main power storage device and a plurality of sub power storage devices sharing a voltage converter (a converter) from being negatively affected in drivability by a process performed to disconnect a last sub power storage device as its use ends.

Solution to Problem

The present invention provides a hybrid vehicle including: a motor generating power to drive the vehicle; an internal combustion engine; a main power storage device; an electric power feeding line; a first voltage converter; a plurality of sub power storage devices provided in parallel to each other; a second voltage converter; a connection unit; a control device; and a traveling control unit. The internal combustion engine is configured to be capable of outputting power to drive the vehicle independently of the motor. The electric power feeding line is configured to supply electric power to an inverter that controls and drives the motor. The first voltage converter is provided between the electric power feeding line and the main power storage device and configured to convert voltage therebetween bidirectionally. The second voltage converter is provided between the plurality of sub power storage devices and the electric power feeding line and configured to convert voltage between one of the plurality of sub power storage devices and the electric power feeding line bidirectionally. The connection unit is provided between the plurality of sub power storage devices and the second voltage converter and configured to control connection and disconnection between the plurality of sub power storage devices and the second voltage converter. The control device is operative in a first mode for controlling the connection unit to connect a selected sub power storage device selected sequentially from the plurality of sub power storage devices to the second voltage converter and also disconnect the sub power storage devices other than the selected sub power storage device from the second voltage converter, and the control device is operative in a second mode for controlling the connection unit to disconnect each of the plurality of sub power storage devices from the second voltage converter. The traveling control unit divides and thus assigns a total power required for the hybrid vehicle to power output from the motor and power output from the internal combustion engine. The traveling control unit in a disconnection process performed for disconnecting a sub power storage device of the plurality of sub power storage devices that is last used from the second voltage converter to shift from the first mode to the second mode, prohibits a process performed for starting the internal combustion engine in a stopped state, and the traveling control unit in the disconnection process prohibits a process performed for stopping the internal combustion engine in an operation state.

The present invention provides a method for controlling a hybrid vehicle including: a motor; an internal combustion engine; a main power storage device; an electric power feeding line; a first voltage converter; a plurality of sub power storage devices; a second voltage converter; a connection unit; a control device; and a traveling control unit, as aforementioned. The method includes the steps of: determining whether a disconnection process is currently performed to disconnect a sub power storage device of the plurality of sub power storage devices that is last used from the second voltage converter to shift from the first mode to the second mode; and prohibiting in the disconnection process a process performed for starting the internal combustion engine in a stopped state and a process performed for stopping the internal combustion engine in an operation state.

The present hybrid vehicle and method for controlling the same prohibits performing a process for starting an internal combustion engine and that for stopping the internal combustion engine while a process is performed for disconnecting a sub power storage device. This can prevent electric power from being input/output as the engine starts/stops. As the disconnection process can be performed with the engine starting/stopping process refrained, the power that can be output to drive the vehicle can be free of variation otherwise introduced. This can prevent the disconnection process from negatively affecting the vehicle in drivability.

Preferably the hybrid vehicle further includes: a rotary element configured to have a speed of rotation varying as an output from the internal combustion engine varies; and a protection control unit generating one of a request to start the internal combustion engine and a request to stop the internal combustion engine to prevent the rotary element from excessive rotation. When the protection control unit generates one of the request to start the internal combustion engine and the request to stop the internal combustion engine, then, regardless of whether the disconnection process is currently performed, the traveling control unit permits one of the process performed for starting the internal combustion engine and the process performed for stopping the internal combustion engine. The method further includes the step of permitting one of the process performed for starting the internal combustion engine and the process performed for stopping the internal combustion engine, regardless of whether the disconnection process is currently performed, when the protection control unit generates one of the request to start the internal combustion engine and the request to stop the internal combustion engine.

Thus, when a request to start or stop the internal combustion engine is generated for the purpose of protecting a component, ensuring drivability can be anteceded by starting/stopping the engine to ensure that the component is protected.

Still preferably, the control device includes a disconnection determination unit and a disconnection prohibition unit. The disconnection determination unit is configured to generate a disconnection request requesting that the disconnection process be started, as based on a state of charge of a residual capacity (SOC) of the selected sub power storage device currently used, in the first mode when there is no remaining sub power storage device allowed to be exchanged with the selected sub power storage device currently used. The disconnection prohibition unit is configured to instruct the disconnection determination unit to avoid generating the disconnection request when one of the process performed for starting the internal combustion engine and the process performed for stopping the internal combustion engine is performed. The method further includes the steps of: generating a disconnection request requesting that the disconnection process be started, as based on a state of charge of a residual capacity (SOC) of the selected sub power storage device currently used, in the first mode when there is no remaining sub power storage device allowed to be exchanged with the selected sub power storage device currently used; and providing an instruction to avoid generating the disconnection request, regardless of the state of charge of the selected sub power storage device, when one of the process performed for starting the internal combustion engine and the process performed for stopping the internal combustion engine is performed.

Thus, starting the process for disconnecting a sub power storage device can be prohibited while the process for starting or stopping the internal combustion engine is performed. This further ensures that the process for starting/stopping the internal combustion engine and that for disconnecting the sub power storage device are not performed concurrently.

Preferably the control device further includes a stop-stepping-up-voltage permission unit configured to decrease a lower limit value of a voltage control range for the electric power feeding line in the second mode to be smaller than the lower limit value in the first mode to set the lower limit value at a voltage output from the main power storage device. The method further includes the step of decreasing a lower limit value of a voltage control range for the electric power feeding line in the second mode to be smaller than the lower limit value in the first mode to set the lower limit value at a voltage output from the main power storage device.

This allows the electric power feeding line to have a reduced voltage without forming a short circuit between the main power storage device and the sub power storage devices in the second mode, as the connection unit disconnects all of the sub power storage devices from the converter. Thus in the second mode the first voltage converter's switching loss can be reduced and the hybrid vehicle's energy efficiency can be increased.

The present invention in another aspect provides a hybrid vehicle including: a motor generating power to drive the vehicle; an internal combustion engine; a main power storage device; an electric power feeding line; a first voltage converter; a plurality of sub power storage devices provided in parallel to each other; a second voltage converter; a connection unit; and a control device. The internal combustion engine is configured to be capable of outputting power to drive the vehicle independently of the motor. The electric power feeding line is configured to supply electric power to an inverter that controls and drives the motor. The first voltage converter is provided between the electric power feeding line and the main power storage device and configured to convert voltage therebetween bidirectionally. The second voltage converter is provided between the plurality of sub power storage devices and the electric power feeding line and configured to convert voltage between one of the plurality of sub power storage devices and the electric power feeding line bidirectionally. The connection unit is provided between the plurality of sub power storage devices and the second voltage converter and configured to control connection and disconnection between the plurality of sub power storage devices and the second voltage converter. The control device is operative in a first mode for controlling the connection unit to connect a selected sub power storage device selected sequentially from the plurality of sub power storage devices to the second voltage converter and also disconnect the sub power storage devices other than the selected sub power storage device from the second voltage converter, and the control device is operative in a second mode for controlling the connection unit to disconnect each of the plurality of sub power storage devices from the second voltage converter. The control device includes a disconnection determination unit and a disconnection prohibition unit. The disconnection determination unit is configured to generate a disconnection request indicating that the first mode be shifted to the second mode, as based on a state of charge of a residual capacity of the selected sub power storage device currently used, in the first mode when there is no remaining sub power storage device allowed to be exchanged with the selected sub power storage device currently used. The disconnection prohibition unit is configured to instruct the disconnection determination unit to avoid generating the disconnection request when one of a process performed for starting the internal combustion engine and a process performed for stopping the internal combustion engine is performed.

The present invention in another aspect provides a method for controlling a hybrid vehicle including: a motor; an internal combustion engine; a main power storage device; an electric power feeding line; a first voltage converter; a plurality of sub power storage devices; a second voltage converter; a connection unit; and a control device, as aforementioned. The method includes the steps of: generating a disconnection request indicating that the first mode be shifted to the second mode, as based on a state of charge of a residual capacity of the selected sub power storage device currently used, in the first mode when there is no remaining sub power storage device allowed to be exchanged with the selected sub power storage device currently used; and providing an instruction to avoid generating the disconnection request, regardless of the state of charge of the selected sub power storage device, when one of a process performed for starting the internal combustion engine and a process performed for stopping the internal combustion engine is performed.

The present hybrid vehicle and method for controlling the same prohibits starting a process for disconnecting a sub power storage device while a process is performed for starting an internal combustion engine or a process is performed for stopping the internal combustion engine. This can prevent electric power from being input/output as the engine starts/stops while the process for disconnecting a sub power storage device is performed. The disconnection process is not performed while the engine starting/stopping process is performed, and the power that can be output to drive the vehicle can be free of variation otherwise introduced. This can prevent the disconnection process from negatively affecting the vehicle in drivability.

Preferably the control device further includes a step-up-voltage instruction unit, an electric power limiter unit, a disconnection control unit, and a stop-stepping-up-voltage permission unit. The step-up-voltage instruction unit is configured to instruct the first voltage converter to provide a voltage on the electric power feeding line to be a first voltage higher than at least voltages output from the main power storage device and the plurality of sub power storage devices, respectively, when the disconnection request is generated. The electric power limiter unit is configured to decrease a value of an upper limit on electric power input/output to/from the selected sub power storage device, gradually to zero after the voltage on the electric power feeding line has reached the first voltage. The disconnection control unit instructs the connection unit to disconnect the selected sub power storage device from the second voltage converter and also hold the sub power storage devices other than the selected sub power storage device disconnected from the second voltage converter when the electric power limiter unit sets at zero the value of the upper limit on electric power input/output. The stop-stepping-up-voltage permission unit is configured to decrease a lower limit value of a voltage control range for the electric power feeding line to be smaller than the lower limit value in the first mode to set the lower limit value at a voltage output from the main power storage device after the disconnection control unit disconnects each the sub power storage device from the second voltage converter. The method further includes the steps of: instructing the first voltage converter to provide a voltage on the electric power feeding line to be a first voltage higher than at least voltages output from the main power storage device and the plurality of sub power storage devices, respectively, when the disconnection request is generated; decreasing a value of an upper limit on electric power input/output to/from the selected sub power storage device, gradually to zero after the voltage on the electric power feeding line has reached the first voltage; instructing the connection unit to disconnect the selected sub power storage device from the second voltage converter and also hold the sub power storage devices other than the selected sub power storage device disconnected from the second voltage converter when the step of decreasing sets at zero the value of the upper limit on electric power input/output; and decreasing a lower limit value of a voltage control range for the electric power feeding line to be smaller than the lower limit value in the first mode to set the lower limit value at a voltage output from the main power storage device after the step of instructing disconnects each the sub power storage device from the second voltage converter.

Thus in disconnecting a sub power storage device the electric power feeding line can have a voltage stepped up to a first voltage higher than both a voltage output from the main power storage device and that output from a sub power storage device that is next used and thereafter the sub power storage device that is next used can be connected to the second electric power converter. This can prevent a short circuit from being formed between a sub power storage device and the main power storage device via the electric power feeding line. Furthermore, the connection unit that disconnects all of the sub power storage devices from the converter allows in the second mode the electric power feeding line to have a reduced voltage without a short circuit formed between the main power storage device and the sub power storage devices. Thus in the second mode the first voltage converter's switching loss can be reduced and the hybrid vehicle's energy efficiency can be increased.

Advantageous Effects of Invention

The present invention can thus prevent a hybrid vehicle configured with a power supply including a main power storage device and a sub power storage devices, with a plurality of power storage devices sharing a voltage converter (a converter), from being negatively affected in drivability by a process performed to disconnect a last sub power storage device as its use ends.

BRIEF DESCRIPTION OF DRAWINGS

FIG. 13 is a first flowchart for illustrating a control process for restricting starting/stopping an engine in a hybrid vehicle in an embodiment of the present invention.

FIG. 14 is a second flowchart for illustrating a control process for restricting starting/stopping an engine in a hybrid vehicle in an embodiment of the present invention.

DESCRIPTION OF EMBODIMENTS

Figure 1:
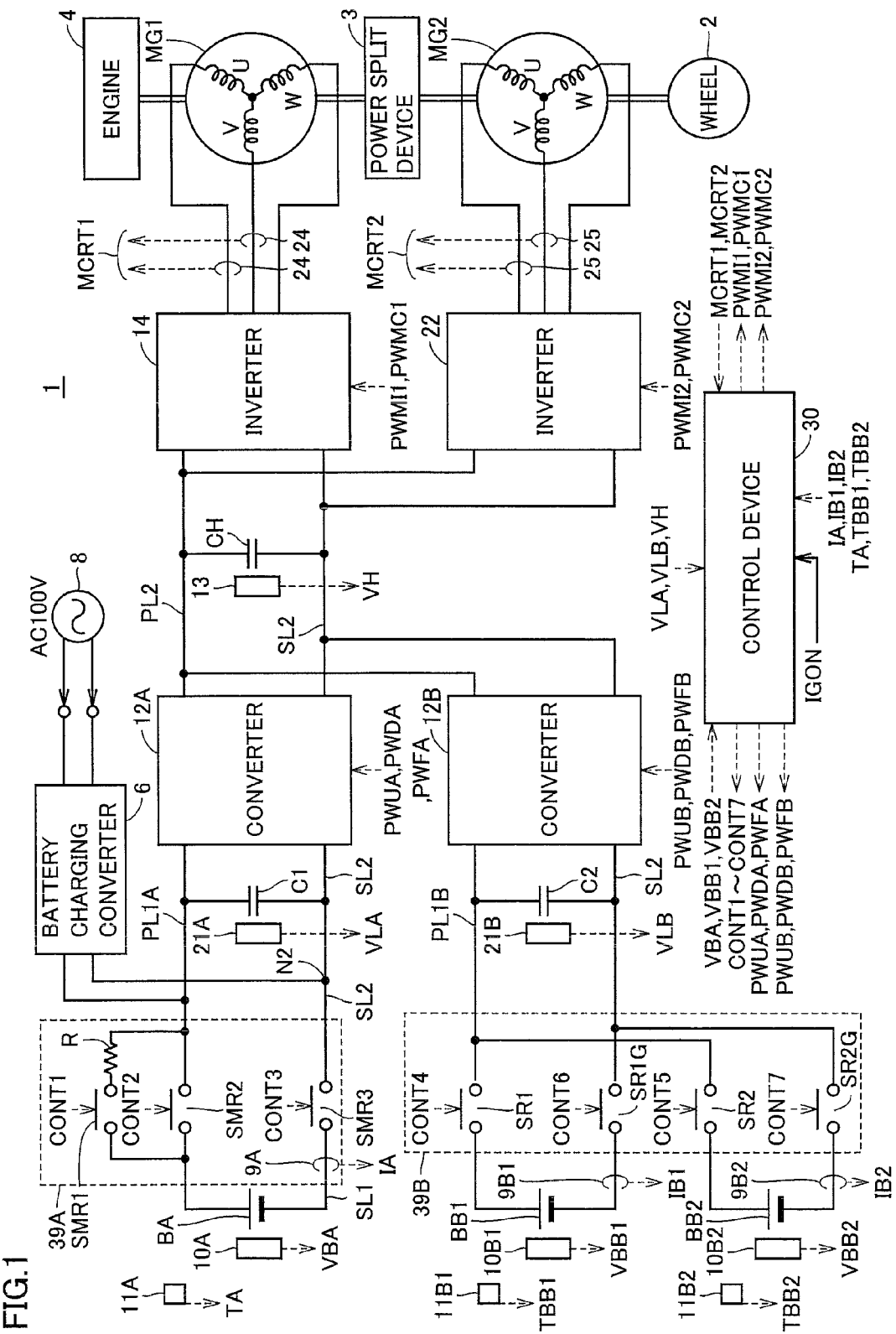
FIG. 1 shows a main configuration of a hybrid vehicle in an embodiment of the present invention.

Hereinafter reference will be made to the drawings to more specifically describe the present invention in embodiments. In the following description, identical or equivalent components are denoted by identical reference characters and will in principle not be described repeatedly.

FIG. 1 shows a main configuration of a hybrid vehicle in an embodiment of the present invention.

With reference to FIG. 1, a hybrid vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor generators MG1, MG2, a wheel 2, a power split device 3, an engine 4, and a control device 30.

The present embodiment provides a hybrid vehicle power supply system configured to include a main power storage device implemented as battery BA, electric power feeding line PL2 supplying electric power to inverter 14 driving motor generator MG2, converter 12A provided between main power storage device (BA) and electric power feeding line PL2 to serve as a voltage converter converting voltage bidirectionally, batteries BB1, BB2 implementing a plurality of sub power storage devices provided in a manner parallel to each other, and converter 12B provided between the plurality of sub power storage devices (BB1, BB2) and electric power feeding line PL2 to serve as a voltage converter converting voltage bidirectionally. Voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that for example when they are concurrently used they can output maximum power tolerated for an electric load (22 and MG2) connected to the electric power feeding line. This allows the vehicle without using the engine, i.e., traveling as an EV, to travel with maximum power. If the sub power storage device's state of charge is decreased, the sub power storage device can be exchanged to cause the vehicle to further travel, and if the sub power storage device's electric power has completely been consumed, then, in addition to the main power storage device, the engine can be used to allow the vehicle to travel with maximum power without using the sub power storage device.

Furthermore, such configuration allows converter 12B to be shared between the plurality of sub power storage devices. This can eliminate the necessity of increasing the number of converters to be equal to that of power storage devices. For further increased EV travelable distance, an additional battery can be introduced in parallel with batteries BB1, BB2.

Preferably, this hybrid vehicle has mounted therein a main power storage device and sub power storage devices that are externally chargeable. For this purpose, hybrid vehicle 1 further includes a battery charging device (a charging converter) 6 for connection to an external power supply 8 which is for example a commercial power supply of AC 100V. Battery charging device 6 converts alternate current to direct current and also adjusts voltage to supply electric power charged to a battery. Note that external charging may be achieved by the above described configuration and in addition a system connecting a neutral point of a stator coil of motor generator MG1, MG2 to alternate current power supply or a system causing converters 12A, 12B to together function as an ac/dc conversion device. Alternatively, the external power supply and the vehicle do not contact each other and in that condition they may be electromagnetically coupled together to provide external charging. Smoothing capacitor C1 is connected between a power supply line PL1A and a ground line SL2. Voltage sensor 21A senses voltage VLA across smoothing capacitor C1 and outputs it to control device 30. Converter 12A can step up voltage across smoothing capacitor C1 and supply it to electric power feeding line PL2.

Smoothing capacitor C2 is connected between a power supply line PL1B and ground line SL2. Voltage sensor 21B senses voltage VLB across smoothing capacitor C2 and outputs it to control device 30. Converter 12B can step up voltage across smoothing capacitor C2 and supply it to electric power feeding line PL2.

Smoothing capacitor CH smoothes the voltage stepped up by converter 12A, 12B. Voltage sensor 13 senses voltage VH across smoothing capacitor CH and outputs it to control device 30.

Alternatively, in an opposite direction, converters 12A, 12B can step down voltage VH smoothed by smoothing capacitor CH and supply it to power supply lines PL1A, PL1B.

Inverter 14 receives direct current voltage from converter 12B and/or 12A, converts it to 3 phase alternate current voltage, and outputs it to motor generator MG1. Inverter 22 receives direct current voltage from converter 12B and/or 12A, converts it to 3 phase alternate current voltage, and outputs it to motor generator MG2.

Power split device 3 is a mechanism coupled to engine 4 and motor generators MG1, MG2 to distribute power therebetween. The power split device can for example be a planetary gear mechanism having the three shafts of rotation of a sun gear, a planetary carrier, and a ring gear. In the planetary gear mechanism when two of the three shafts of rotation have their rotation determined, that of the other one shaft of rotation is compulsively determined. These three shafts of rotation are connected to engine 4, motor generators MG1, MG2 at their respective shafts of rotation, respectively. Motor generator MG2 has its shaft of rotation coupled to vehicular wheel 2 by a reduction gear, a differential gear or the like (not shown). Furthermore, power split device 3 may further have a speed reducer incorporated therein for the shaft of rotation of motor generator MG2. In other words, variation of the engine's output not only varies the engine's speed but also acts through the variation of the engine's speed to vary the speed of a rotary element (MG1, MG2 and the like) coupled to power split device 3.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (a ground line SL1) and node N2.

System main relays SMR1-SMR3 have their conduction/non-conduction states controlled (or are turned on/off) by relay control signals CONT1-CONT3, respectively, issued from control device 30.

Voltage sensor 10A measures voltage VA across battery BA. Furthermore, temperature sensor 11A measures temperature TA of battery BA, and current sensor 9A measures a current IA input/output to/from battery BA. These measurements are output to control device 30. Based on these measurements, control device 30 monitors a state of battery BA represented by state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SRL SR2 have their conduction/non-conduction states controlled (or are turned on/off) by relay control signals CONT4, CONT5, respectively, issued from control device 30. Relays SR1G, SR2G have their conduction/non-conduction states controlled (or are turned on/off) by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB I and VBB2 across batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors the states of batteries BB1, BB2 represented by state of charge (SOC).

Battery BA, BB1, BB2 can for example be a lead-acid battery, a nickel metal hydride battery, a lithium ion battery or a similar secondary battery, an electric double layer capacitor or a similar capacitor of large capacity, or the like.

Inverter 14 is connected to electric power feeding line PL2 and ground line SL2. Inverter 14 receives voltage stepped up from converter 12A and/or converter 12B, and drives motor generator MG1 for example to start engine 4. Furthermore, inverter 14 returns to converters 12A and 12B the electric power generated by motor generator MG1 by power transmitted from engine 4. At the time, converters 12A and 12B are controlled by control device 30 to operate as step down converters.

Current sensor 24 senses a current that flows to motor generator MGI as a motor current value MCRT1, and outputs motor current value MCRT1 to control device 30.

Inverter 22 is connected to electric power feeding line PL2 and ground line SL2 in a manner parallel with inverter 14. Inverter 22 receives direct current voltage from converters 12A and 12B, converts it to 3 phase alternate current voltage, and outputs it to motor generator MG2 driving wheel 2. Furthermore, inverter 22 returns to converters 12A and 12B the electric power generated by motor generator MG2 as the vehicle is regeneratively braked. At the time, converters 12A and 12B are controlled by control device 30 to operate as step down converters.

Current sensor 25 senses a current that flows to motor generator MG2 as a motor current value MCRT2, and outputs motor current value MCRT2 to control device 30.

Control device 30 is constituted by an electronic control unit (ECU) having a central processing unit (CPU) and a memory (not shown) incorporated therein, and in accordance with a map and a program stored in the memory, uses each sensor's measurement to perform an operation process. Note that control device 30 may have a portion configured to allow an electronic circuit or similar hardware to perform predetermined arithmetic and logical operations.

More specifically, control device 30 receives torque command values for motor generators MG1, MG2, respectively, the motor generators' respective speeds, the voltage VBA, VBB1, VBB2, VLA, VLB, VH values, motor current values MCRT1, MCRT2, and a start signal IGON and accordingly controls converters 12A, 12B and inverters 14, 22.

Control device 30 outputs control signals PWUA, PWUB instructing converters 12A, 12B to step up voltage, control signals PWDA, PWDB instructing converters 12A, 12B to step down voltage, control signals PWFA, PWFB instructing converters 12A, 12B to hold voltage, and a shutdown signal (not shown) prohibiting converters 12A, 12B from operation.

Furthermore, control device 30 outputs a control signal PWMI1 instructing inverter 14 to convert direct current voltage output from converters 12A, 12B to alternate current voltage for driving motor generator MG1, and a control signal PWMC1 instructing inverter 14 to convert alternate current voltage generated by motor generator MG1 to direct current voltage and return it toward converters 12A, 12B for regeneration.

Similarly, control device 30 outputs a control signal PWMI2 instructing inverter 22 to convert direct current voltage to alternate current voltage for driving motor generator MG2, and a control signal PWMC2 instructing inverter 22 to convert alternate current voltage generated by motor generator MG2 to direct current voltage and return it toward converters 12A, 12B for regeneration.

Figure 2:
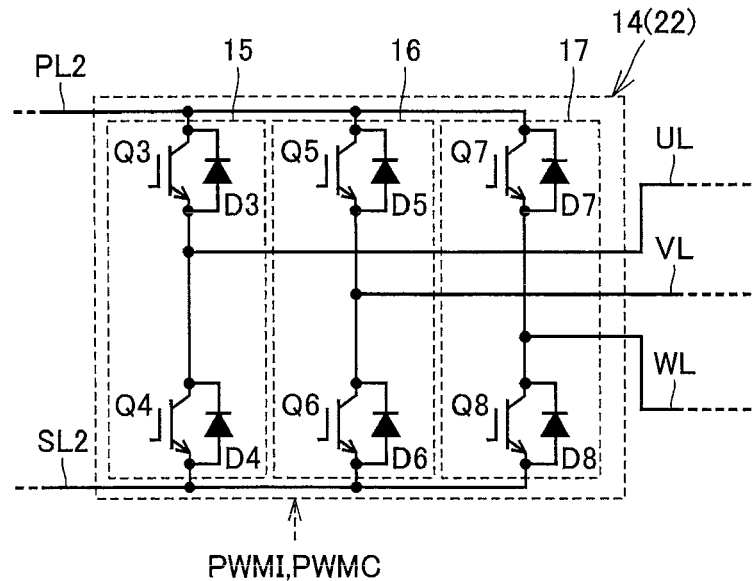
FIG. 2 is a circuit diagram showing in detail a configuration of each inverter shown in FIG. 1.

FIG. 2 is a circuit diagram showing in detail a configuration of inverters 14 and 22 shown in FIG. 1.

With reference to FIG. 2, inverter 14 includes a U phase arm 15, a V phase arm 16, and a W phase arm 17. U phase arm 15, V phase arm 16, and W phase arm 17 are connected between electric power feeding line PL2 and ground line SL2 in parallel.

U phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4. Diode D3 has its cathode connected to IGBT device Q3 at the collector, and its anode to IGBT device Q3 at the emitter. Diode D4 has its cathode connected to IGBT device Q4 at the collector and its anode to IGBT device Q4 at the emitter.

V phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as done in U phase arm 15.

W phase aim 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as done in U phase aim 15.

Note that in the present embodiment an IGBT device is indicated as a representative example of a power semiconductor switching element controllable to be turned on/off. In other words, it is also replaceable with a bipolar transistor, a field effect transistor or a similar power semiconductor switching element.

Each phase arm has an intermediate point connected to motor generator MG1 at each phase coil at each phase end. In other words, motor generator MG1 is a 3 phase permanent magnet synchronous motor and the three U, V, W phase coils each have one end connected together to an intermediate point. The U phase coil has the other end connected to a line UL drawn from a connection node of IGBT devices Q3, Q4. The V phase coil has the other end connected to a line VL drawn from a connection node of IGBT devices Q5, Q6. The W phase coil has the other end connected to a line WL drawn from a connection node of IGBT devices Q7, Q8.

Inverter 22 shown in FIG. 1 is different in that it is connected to motor generator MG2. However, its internal circuit configuration is similar to inverter 14. Accordingly it will not be described repeatedly in detail. Furthermore, FIG. 2 shows an inverter receiving control signals PWMI, PWMC. This is to avoid complexity. Specifically, as shown in FIG. 1, different control signals PWMI1, PWMC1 and control signals PWMI2, PWMC2 are input to inverters 14, 22, respectively.

Figure 3:
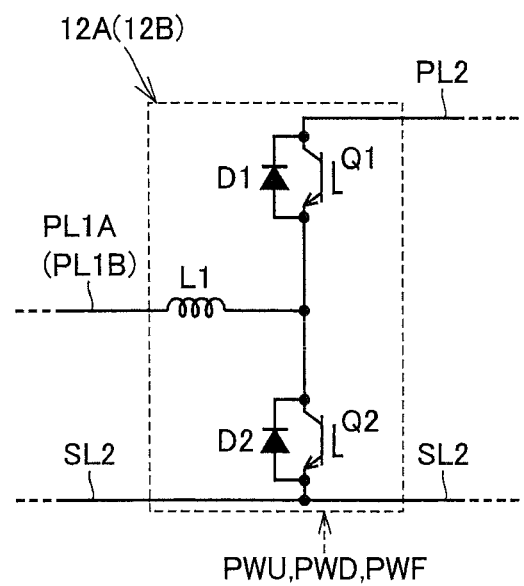
FIG. 3 is a circuit diagram showing in detail a configuration of each converter shown in FIG. 1.

FIG. 3 is a circuit diagram showing in detail a configuration of converters 12A and 12B shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode to IGBT device Q1 at the emitter.

Converter 12B shown in FIG. 1 is different from converter 12A in that the former is not connected to power supply line PL1A and instead to power supply line PL1B. However, its internal circuit configuration is similar to converter 12A. Accordingly it will not be described repeatedly in detail. Furthermore, FIG. 3 shows a converter receiving control signals PWU, PWD, PWF. This is to avoid complexity. Specifically, as shown in FIG. 1, different control signals PWUA, PWDA, PWFA and control signals PWUB, PWDB, PWF are input to converters 12A and 12B, respectively.

Converters 12A, 12B have IGBT devices Q1, Q2 switched as (or have a duty) controlled by control signals PWUA, PWUB to step up direct current voltage VLA, VLB to generate direct current voltage VH on electric power feeding line PL2. Converters 12A, 12B have IGBT devices Q1, Q2 switched as controlled by control signals PWDA, PWDB to step down direct current voltage VH on electric power feeding line PL2 to supply it to batteries BA, BB. Converters 12A, 12B are thus configured to be capable of converting electric power bidirectionally to control a voltage conversion ratio VH/VLA (or VH/VLB). Furthermore, converters 12A, 12B can also operate in response to control signals PWFA, PWFB to hold on IGBT device Q1 (an upper arm) (a lower arm, or IGBT device Q2, is held off) to hold VH=VLA (or VH=VLB).

Note that in stepping up/down voltage, IGBT devices Q1, Q2 are switched (or turned on/off) as controlled in accordance with a constant switching frequency, and thus cause electric power loss. In contrast, when voltage is held (or the upper arm is held on), the IGBT devices are not turned on and off. They thus do not cause electric power loss, and the converters' efficiency and hence the mileage of hybrid vehicle 1 are relatively improved.

Again with reference to FIG. 1, in the power supply system of hybrid vehicle 1, a parallel battery mode (or a first mode) is basically selected. The parallel battery mode allows battery BA (the main power storage device) and a sub power storage device selected from batteries BB1, BB2 (hereinafter also referred to as a "selected sub power storage device BB") to be used in parallel. In the parallel battery mode, battery BA and a selected sub power storage device BB, and motor generators MG1, MG2 transmit and receive electric power therebetween.

Control device 30 receives sensed values from voltage sensor 10A, temperature sensor 11A and current sensor 9A, and in accordance therewith sets an SOC (M) indicating the main power storage device's residual capacity, an upper limit on electric power input Win (M) indicating an upper limit value of electric power charged thereto, and an upper limit on electric power output Wout (M) indicating an upper limit value of electric power discharged therefrom.

Furthermore, control device 30 receives sensed values from voltage sensors 10B1, 10B2, temperature sensors 11B1, 11B2 and current sensors 9B1, 9B2 and in accordance therewith sets an SOC (B) of the selected sub power storage device BB and upper limits on electric power input and output Win (S) and Wout(S) thereto and therefrom, respectively.

Generally, an SOC is indicated by a ratio (%) of each battery's current charged amount to its fully charged state. Furthermore, Win, Wout are indicated as such an upper limit value of electric power that when that electric power of the upper limit value is discharged for a predetermined period of time (e.g., for approximately 10 seconds) the battery of interest (BA, BB1, BB2) is not overcharged/overdischarged.

In the parallel battery mode, the electric power of the selected sub power storage device BB, rather than battery BA, is preferentially used. When the electric power stored in the selected sub power storage device BB is completely consumed, connection unit 39B has its internal relay switched on/off to switch the selected sub power storage device BB to another, and if the last one of the sub power storage devices (batteries BB1, BB2) is the selected sub power storage device BB, i.e., when there is no more available sub power storage device left, and the currently selected sub power storage device BB's electric power is completely consumed, then all sub power storage devices BB1, BB2 are electrically disconnected and main power storage device BA alone serves as a power supply, i.e., a single battery mode (a second mode) is applied.

More specifically, in the single battery mode, connection unit 39B has its internal relays each turned off to mechanically interrupt a conduction path between batteries BB1, BB2 and electric power feeding line PL2. This eliminates a possibility that a conduction path is formed between batteries BB1, BB2 and battery BA.

It is understood from FIG. 1 and FIG. 3 that in the parallel battery mode it is necessary that electric power feeding line PL2 has voltage VH at least higher than voltage output from battery BA and that output from the selected sub power storage device BB to prevent battery BA and batteries BB1, BB2 from having a short circuit formed therebetween.

Furthermore, electric power feeding line PL2 has voltage VH, with a lower limit value set therefor, which is also restricted in view of controlling motor generators MG1, MG2. More specifically, in view of controlling the motors, it is preferable that voltage VH be higher than induced voltage of motor generators MG1, MG2. Accordingly, in effect, voltage VH is controlled to be higher than both a lower limit value set in view of the restriction set for the batteries and that set in view of controlling the motors.

Accordingly, in the parallel battery mode, when voltage VH may be reduced in view of controlling the motors, typically when it is not necessary that converters 12A, 12B step up voltage, it is necessary despite that to cause converters 12A, 12B to perform a voltage step up operation to satisfy the lower limit value set in view of the restriction set for the batteries.

After both batteries BB1 and BB2, i.e., all sub power storage devices are exhausted if a relay maintains connection there is a possibility that a short circuit may be formed between battery BA and battery BB1, BB2 through the converter 12B diode D1 and electric power feeding line PL2. Accordingly in the present embodiment when there is no sub power storage device available the power supply system shifts to the single battery mode to electrically disconnect all of the sub power storage devices from the power supply system.

This can eliminate the necessity of stepping up voltage in view of the restriction set for the batteries, and when it is not necessary in view of controlling the motors that converter 12A step up voltage, converter 12A can be operated in a voltage holding mode to reduce an electric power loss caused at converter 12A.

Figure 4:
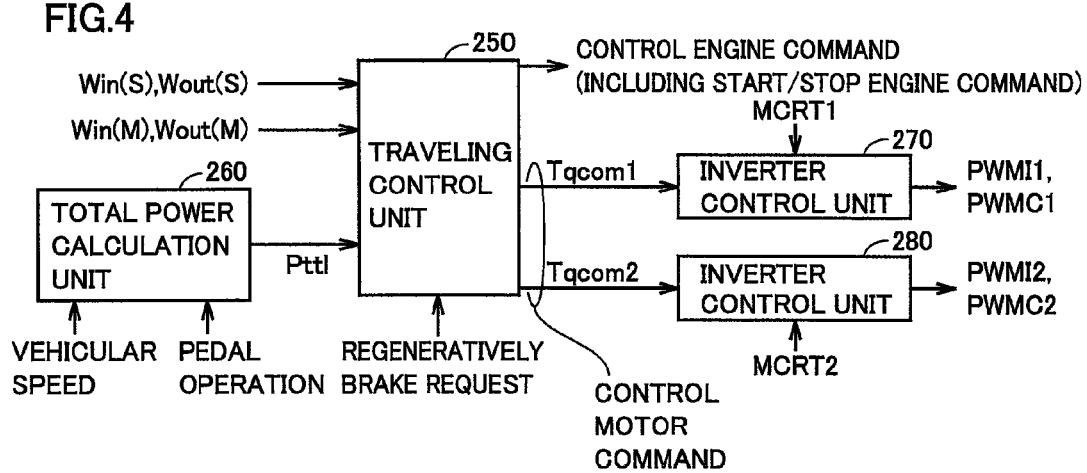
FIG. 4 is a functional block diagram for illustrating how traveling of a hybrid vehicle is controlled.

FIG. 4 is a functional block diagram for illustrating how control device 30 controls traveling of hybrid vehicle 1, more specifically, a configuration of power distribution control between engine 4 and motor generators MG1, MG2. FIG. 4 shows function blocks, which are implemented by control device 30 executing a previously stored, predetermined program and/or by processing of an operation by electronic circuitry (hardware) in control device 30.

With reference to FIG. 4, a total power calculation unit 260 calculates total power Pttl required for the entirety of hybrid vehicle 1 from vehicular speed and an operation of a pedal (an accelerator pedal). Note that total required power Pttl may also include power required (i.e., the engine's output), depending on the vehicle's condition, for generating electric power by motor generator MG1 to charge a battery.

A traveling control unit 250 receives the upper limits on electric power input/output Win(M), Wout(M) to/from main power storage device BA, the upper limits on electric power input/output Win(S), Wout(S) to/from a selected sub power storage device BB, total required power Pttl from total power calculation unit 260, and a regenerative brake request made when the brake pedal is operated. Traveling control unit 250 generates a control motor command, or torque command values Tqcom1 and Tqcom2, to allow motor generators MG1, MG2 to in total receive/output electric power within a charging limit (Win (M)+Win (S)) and a discharging limit (Wout (M)+Wout (S)) in total for main power storage device BA and the selected sub power storage device BB.

Furthermore, to ensure total required power Pttl, it is assigned between power provided by motor generator MG2 to drive the vehicle and that provided by engine 4 to do so. In particular, an externally charged battery's electric power is maximally utilized to restrict engine 4 from operation or the power provided by engine 4 to drive the vehicle is set to correspond to a range allowing engine 4 to be highly efficiently operable to control the vehicle to travel to achieve high fuel-efficiency.

An inverter control unit 270 receives torque command value Tqcom1 and motor current value MCRT1 of motor generator MG1 and therefrom generates control signals PWMI1, PWMC1 for inverter 14. Similarly an inverter control unit 280 receives torque command value Tqcom2 and motor current value MCRT2 of motor generator MG2 and therefrom generates control signals PWMI2, PWMC2 for inverter 22. Furthermore, traveling control unit 250 generates a control engine command in response to a value requested of power provided by the engine to drive the vehicle, as set. Furthermore, a control device (an engine ECU) (not shown) controls the operation of engine 4 in accordance with the control engine command.

When hybrid vehicle 1 actively uses a battery's electric power to travel (i.e., in an EV mode), and total required power Pttl is equal to or smaller than the batteries' total upper limit on electric power output Wout(M)+Wout(S) engine 4 is not operated and motor generator MG2 alone provides power to drive the vehicle to travel. When total required power Pttl exceeds Wout(M)+Wout(S), engine 4 is started.

In contrast, when the EV mode is not selected, i.e., in an HV mode, distribution of driving power between engine 4 and motor generator MG2 is controlled to maintain the batteries' SOC at a predetermined target value. In other words, the vehicle is controlled to travel with engine 4 more actuatable than in the EV mode. In the single battery mode the HV mode is applied.

When engine 4 is stopped and it is necessary to start it in accordance with such driving power distribution control as described above, traveling control unit 250 generates a request to start engine 4. In response to the request, a start engine command is generated, and motor generator MG1 is controlled to generate a torque cranking engine 4 (a torque for positive rotation). In other words, an engine starting process requires that the power supply system supplies electric power consumed by motor generator MG1 to generate the cranking torque.

Similarly, when engine 4 is in operation and it is necessary to stop it in accordance with such driving power distribution control as described above, traveling control unit 250 generates a stop engine request. In response to this request, a stop engine command is generated, and in response, supplying fuel to engine 4 is stopped (or fuel is cut), and to reduce/prevent vibration, after fuel is cut, motor generator MG1 is driven to control speed reduction, use regenerative braking immediately before the engine stops. In an engine stopping process, the power supply system receives/outputs electric power for the above motor driving and regenerative braking, and the like.

Note that hybrid vehicle 1 has engine 4 and motor generators MG1, MG2 coupled via power split device 3, and accordingly, when a rotary element, e.g., engine 4 or motor generator MG1, coupled to power split device 3 rotates at an excessively increased speed, a start or stop engine request may be generated to reduce/prevent that excessively increased speed to protect components. For example, this corresponds to: stopping engine 4 to remove the engine's output torque so that motor generator MG1 and engine 4 rotate at a reduced speed; starting engine 4 to suppress a negative speed of rotation of motor generator MG1; and the like.

In the EV mode, charging and discharging are controlled to preferentially use the electric power of the selected sub power storage device BB rather than that of main power storage device BA. As such, when the vehicle is traveling, and a currently used, selected sub power storage device BB is decreased in SOC, the selected sub power storage device BB needs to be switched. For example, if battery BB1 is set as a selected sub power storage device BB in starting the vehicle, a necessity will arise to subsequently disconnect battery BB1 from converter 12B and connect battery BB2 as a now selected sub power storage device BB to converter 12B, i.e., to perform a connection switching process.

Furthermore, when the last one of the sub power storage devices is used as a selected sub power storage device BB, i.e., when there is no available sub power storage device left, and the current sub power storage device BB's SOC is decreased, it is necessary to shift to the single battery mode. Hereinafter, a determination on whether to shift from the parallel battery mode to the single battery mode will also be referred to as a disconnection determination. Furthermore, a request generated in accordance with the disconnection determination to shift from the parallel battery mode to the single battery mode will also be referred to as a disconnection request.

In doing so, while a process is being performed to disconnect a selected sub power storage device, only main power storage device BA is available, and the power that the power supply system as a whole can receive/output decreases. Furthermore, as described above, the engine starting/stopping process involves inputting/outputting electric power to/from the power supply system. As such, when the process disconnecting the selected sub power storage device and the process starting/stopping the engine overlap, electric power required for the latter process has an effect to temporarily prevent ensuring power that can be generated in the entirety of the vehicle to drive it, and the vehicle's drivability may be affected.

As such, it is necessary to determine when the engine starting/stopping process and the process for disconnecting a selected sub power storage device should be performed, with consideration given to preventing the latter process from affecting drivability.

Figure 5:
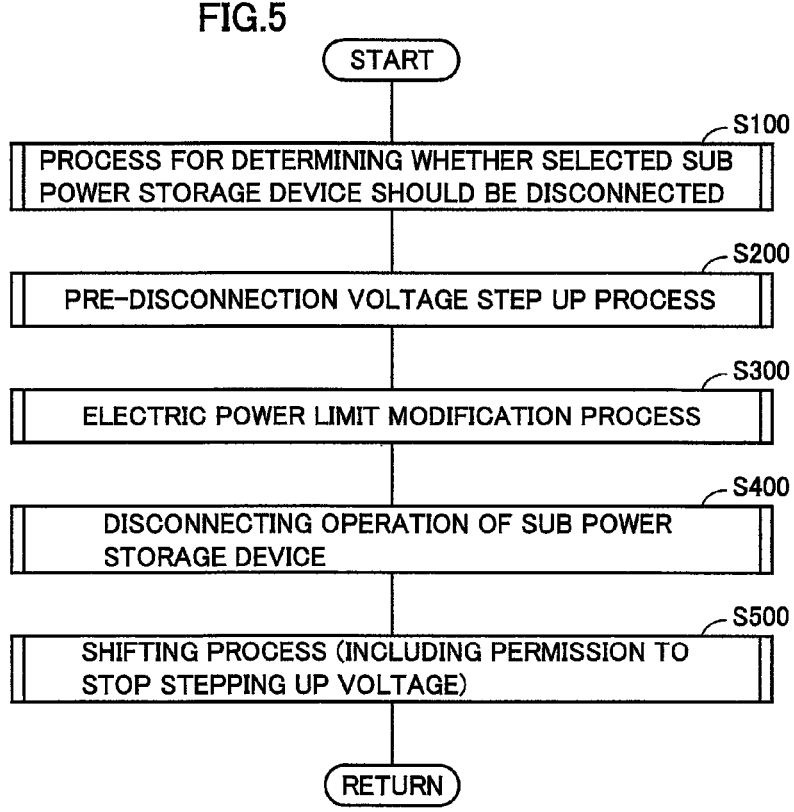
FIG. 5 is a flowchart of a general procedure of a process performed to disconnect a selected sub power storage device in a hybrid vehicle in an embodiment of the present invention.

FIG. 5 is a flowchart of a general procedure of a process performed to disconnect a selected sub power storage device in a power supply system of a hybrid vehicle in an embodiment of the present invention. Furthermore, FIG. 6, and FIGS. 8-11 are flowcharts for specifically illustrating the FIG. 5 steps S100, S200, S300, S400, and S500.

Control device 30 can execute a previously stored, predetermined program periodically, as predetermined, to repeatedly perform a control process procedure in accordance with the flowchart indicated in FIGS. 5, 6, 8-11, periodically as predetermined. A process can thus be implemented for disconnecting a sub power storage device in a power supply system of a hybrid vehicle in an embodiment of the present invention.

With reference to FIG. 5, control device 30 in step S100 performs a process for determining whether a selected sub power storage device should be disconnected. If control device 30 determines that it is necessary to disconnect the selected sub power storage device, the following steps S200-S500 are performed. If in step S100 control device 30 determines that it is not necessary to disconnect the selected sub power storage device, steps S200-S500 are substantially not performed.

Control device 30 in step S200 performs a pre-disconnection voltage step up process and in step S300 performs an electric power limit modification process so that a request is not generated to the power supply system to excessively charge/discharge while the sub power storage device is being disconnected. Control device 30 in step S400 performs a disconnection operation to electrically disconnect from the power supply system all sub power storage devices (battery BB1, BB2) including the selected sub power storage device BB, and after the operation is completed, control device 30 proceeds to step S500 to perform a shifting process to use only battery BA, or enter the single battery mode, and thus start supplying electric power.

Figure 6:
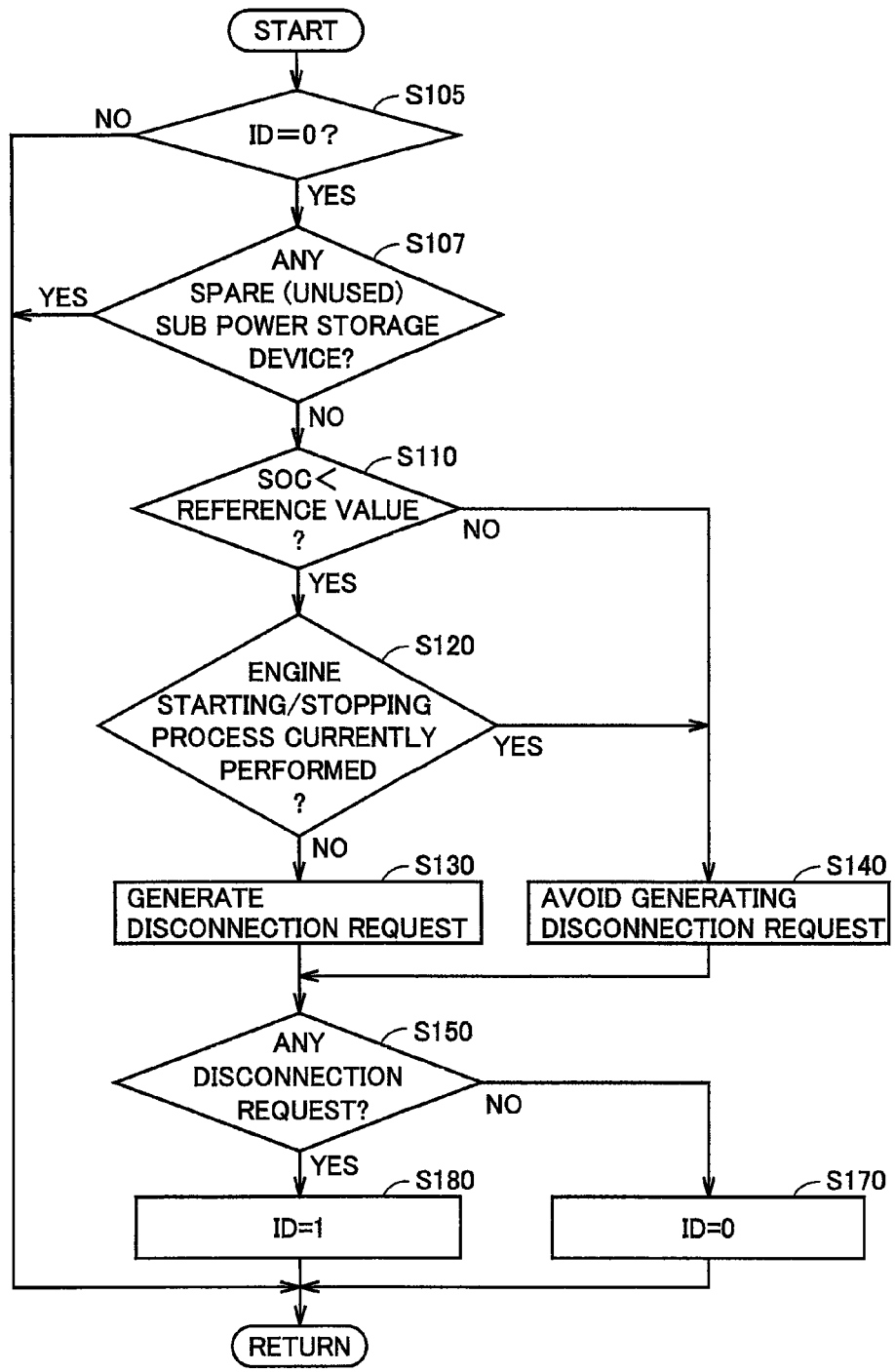
FIG. 6 is a flowchart for illustrating in detail a process performed to determine whether a sub power storage device should be disconnected, as shown in FIG. 5.

FIG. 6 is a flowchart for illustrating in detail a process performed to determine whether a selected sub power storage device should be disconnected (S100), as shown in FIG. 5.

As will be described hereinafter, a variable ID is introduced to indicate the disconnection process's status. ID is set at any of, −1 and 0-4. ID=0 indicates a status in which the parallel battery mode is applied and no disconnection request is generated. In other words, when ID=0, whether to shift to the single battery mode, i.e., whether a selected sub power storage device BB should be disconnected is determined periodically as predetermined.

Note that in starting the power supply system, whether the single battery mode should be applied may be determined depending on whether equipment has failure, the batteries' condition, and the like. If as a result of such determination the single battery mode is not applied, then until the power supply system is stopped, ID=−1 is held.

With reference to FIG. 6, control device 30 proceeds to step S105 to determine whether ID=0. If ID=0 (YES at S105) control device 30 starts the disconnection determination process substantially.

Initially, control device 30 proceeds to step S107 to determine whether there is a sub power storage device other than the currently used selected sub power storage device BB, that can be exchanged and used. If so (YES at S107), then if the currently selected sub power storage device BB is exhausted, the parallel battery mode continues, and the following steps of the disconnection determination process (i.e., step S110 et seq.) are not performed.

If No at step S107, i.e., if there is no available sub power storage device left and the last one is the selected sub power storage device BB, then control device 30 furthers the process for determining whether the selected sub power storage device should be disconnected.

Control device 30 in step S110 determines from the selected sub power storage device BB's state of charge (SOC) whether it is necessary to generate a disconnection request. For example, the selected sub power storage device BB's SOC is compared with a predetermined reference value, and when the SOC is decreased to be lower than the reference value, step S110 is YES.

When step S110 is YES, control device 30 proceeds to step S120 to determine whether a process is currently performed for stopping or starting engine 4. For example, this process can be performed based on flags (STREG, STPEG indicated in FIG. 15) used in controlling the engine. Flag STREG is set on when a start engine command is generated, and the flag continues to be set on until the engine's speed increases to attain a predetermined value. Flag STPEG is set on when a stop engine command is generated, and the flag continues to be set on until the engine stops (or its speed=0).

Furthermore, if step S120 is NO, i.e., if the selected sub power storage device BB has an SOC decreased to be lower than the reference value and neither the engine starting process nor the engine stopping process is performed, then control device 30 proceeds to step S130 to generate a disconnection request to disconnect the selected sub power storage device BB.

If the SOC is decreased (YES at S110), and the engine starting process or the engine stopping process is currently performed (YES at S120), control device 30 proceeds to step S140 to avoid generating the disconnection request.

Note that if the selected sub power storage device BB has an SOC equal to or larger than the reference value (NO at S110), control device 30 also proceeds to step S140 to avoid generating the disconnection request.

Control device 30 in step S150 confirms whether there is a disconnection request. If there is a disconnection request generated (YES at S150), control device 30 proceeds to step S180 to set ID=1 to further the disconnection process. In other words, ID=1 indicates a status in which a disconnection request is generated and the disconnection process is started.

If in step S110 control device 30 determines that it is not necessary to disconnect the selected sub power storage device (NO at S150), control device 30 proceeds to step S170 to maintain ID=0 and thus end the disconnection determination process. Consequently in the subsequent and following control cycles when step S105 is YES the disconnection determination process will again be performed. As a result, when the engine 4 stopping or starting process is performed and in that condition an SOC is decreased to be smaller than the reference value, a disconnection request is not generated until the process ends.

Note that once ID≥1 has been set and the disconnection process has been started, or when ID=−1 is set to avoid applying the single battery mode (NO at S105), steps S107-S180 are skipped and the disconnection determination process is substantially not performed.

Figure 7:
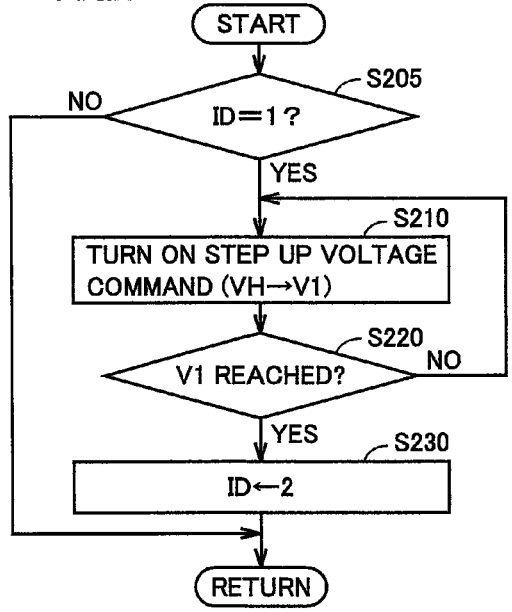
FIG. 7 is a flowchart for illustrating in detail a pre-disconnection voltage step up process shown in FIG. 5.

FIG. 7 is a flowchart for illustrating in detail a pre-disconnection voltage step up process (S200) shown in FIG. 5.

With reference to FIG. 7, control device 30 in the pre-disconnection voltage step up process proceeds to step S205 to confirm whether ID=1. If ID=1, and a disconnection request to disconnect a selected sub power storage device BB is made and the disconnection process is started (YES at S205), control device 30 proceeds to step S210 to generate a command to converter 12A to step up voltage to step up voltage VH on electric power feeding line PL2 to a predetermined voltage V1. In response to the step up voltage command, a voltage command value VHref for electric power feeding line PL2 is set to be equal to V1, and to implement this voltage command value, control signal PWUA for converter 12A is generated.

Note that predetermined voltage V1 is set to be higher than any voltage output from batteries BA, BB1, BB2. For example, predetermined voltage V1 set at an upper limit control voltage VHmax that can be stepped up by converter 12A ensures that voltage VH when a step up voltage command is issued is higher than any voltage output from batteries BA, BB1, BB2. Alternatively, in view of reducing a loss caused at converter 12A, predetermined voltage V1 may be determined, as occasion demands, to have a margin relative to a maximum one of voltages output from batteries BA, BB1, BB2 at the time.

If in step S210 a step up voltage command is generated, control device 30 proceeds to step S220 to determine from a value as sensed by voltage sensor 13 whether voltage VH has reached predetermined voltage V1. Step S220 is YES for example when VH≥V1 continues for a predetermined period of time.

Once voltage VH has reached predetermined voltage V1 (YES at S220), control device 30 proceeds to step S230 to further the ID from 1 to 2. Until voltage VH reaches V1 (NO at S220), ID=1 is held. In other words, ID=2 indicates a status in which the pre-disconnection voltage step up process ends and the disconnection process can be furthered. If ID≠1 (NO at S205), the subsequent steps S210-S230 are skipped.

Figure 8:
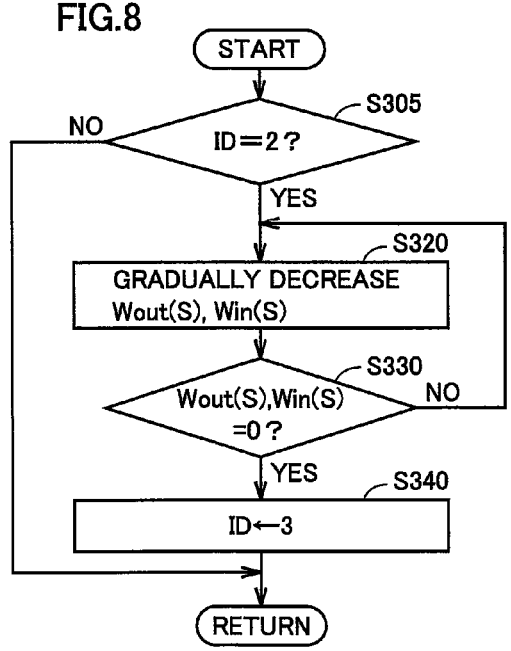
FIG. 8 is a flowchart for illustrating in detail an electric power limit modification process shown in FIG. 5.

Thus when the pre-disconnection voltage step up process (step S200) ends, control device 30 performs the electric power limit modification process as shown in FIG. 8.

FIG. 8 is a flowchart for illustrating in detail the electric power limit modification process (S300) shown in FIG. 5.

With reference to FIG. 8, control device 30 in the electric power limit modification process initially proceeds to step S305 to determine whether ID=2. If not, (NO at S305), the subsequent steps S320-340 are skipped.

If ID=2 (YES at S305), control device 30 proceeds to step S320 to gradually decrease in absolute value the upper limits on electric power input/output Win(S), Wout(S) to/from a selected sub power storage device BB. For example, Wout(S), Win(S) are decreased gradually toward 0 at a predetermined fixed rate.

Control device 30 proceeds to step S330 to determine whether Wout(S), Win(S) have reached 0. Until Wout(S)=Win(S)=0, step S320 is repeated to continuously decrease Wout(S) and Win(S).

Once Wout(S) and Win(S) have reached 0 (YES at S330), control device 30 proceeds to step S340 to further the ID from 2 to 3. In other words, ID=3 indicates a status in which the pre-disconnection voltage step up process and the electric power limit modification process have ended and actual disconnection between sub power storage devices BB1, BB2 and converter 12B is startable.

Figure 9:
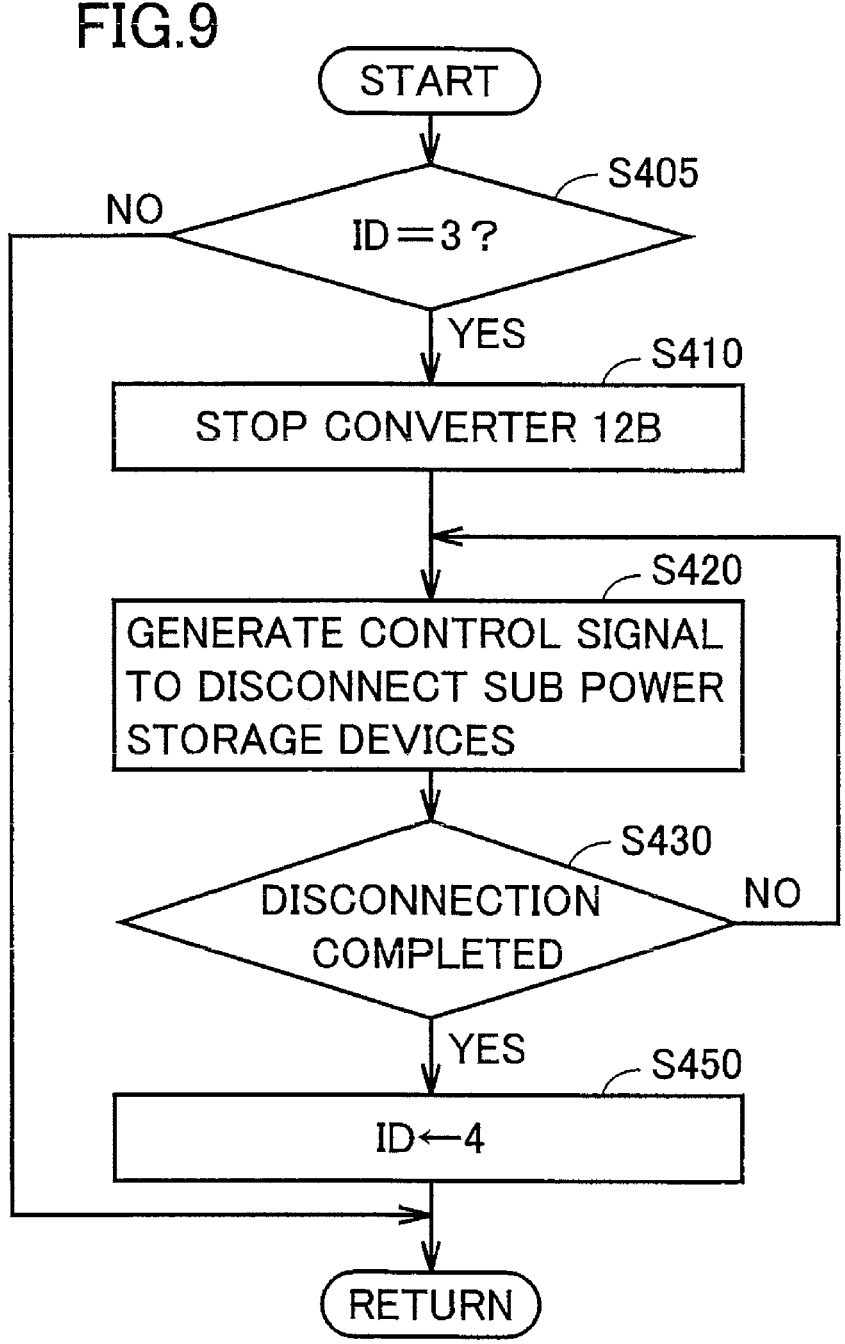
FIG. 9 is a flowchart for illustrating in detail a disconnection operation shown in FIG. 5.

When the FIG. 9 electric power limit modification process ends, control device 30 proceeds to step S400 to perform the process for disconnecting the sub power storage device.

FIG. 9 is a flowchart for illustrating in detail a disconnection operation to disconnect a sub power storage device (S400), as shown in FIG. 5.

With reference to FIG. 9, control device 30 in the operation disconnecting a sub power storage device initially proceeds to step S405 to determine whether ID=3. If ID≠3 (NO at S405), the following steps are skipped.

If ID=3 (YES at S405), control device 30 proceeds to step S410 to stop converter 12B as a preparation for disconnecting the sub power storage device. More specifically, in converter 12B, IGBT devices Q1, Q2 are forced to turn off in response to a shutdown command, and in that condition, control device 30 proceeds to step S420 to generate a relay control signal for disconnecting from the power supply system all sub power storage devices (batteries BB1, BB2) including the selected sub power storage device BB. More specifically, relay control signals CONT3-CONT7 are generated to turn off each of relays SR1, SR1G, SR2, and SR2G.

Furthermore, control device 30 proceeds to step S430 to determine whether turning off the relays, as instructed in step S420, has been completed. When turning off the relays has completed disconnection (YES at S430), control device 30 proceeds to step S450 to further the ID from 3 to 4. In other words, ID=4 indicates a status in which all sub power storage devices have completely been disconnected.

When step S400 or the disconnection operation ends, control device 30 proceeds to step S500 to perform the shifting process.

Figure 10:
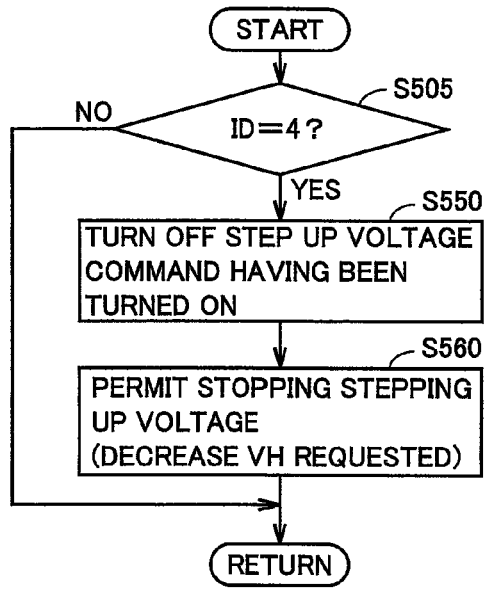
FIG. 10 is a flowchart for illustrating in detail a shifting process shown in FIG. 5.

FIG. 10 is a flowchart for illustrating in detail the shifting process (S500) shown in FIG. 5.

With reference to FIG. 10, control device 30 in the shifting process initially proceeds to step S505 to determine whether ID=4. If ID≠4 (NO at S505), the following steps are skipped.

If ID=4 (YES at S505), control device 30 proceeds to step S550 to turn off the step up voltage command generated in step S210 (FIG. 8). The voltage command value for electric power feeding line PL2 is thus set at the value assumed before the step up voltage command is generated, more specifically, a value set in accordance with the states of motor generators MG1, MG2.

Figure 11:
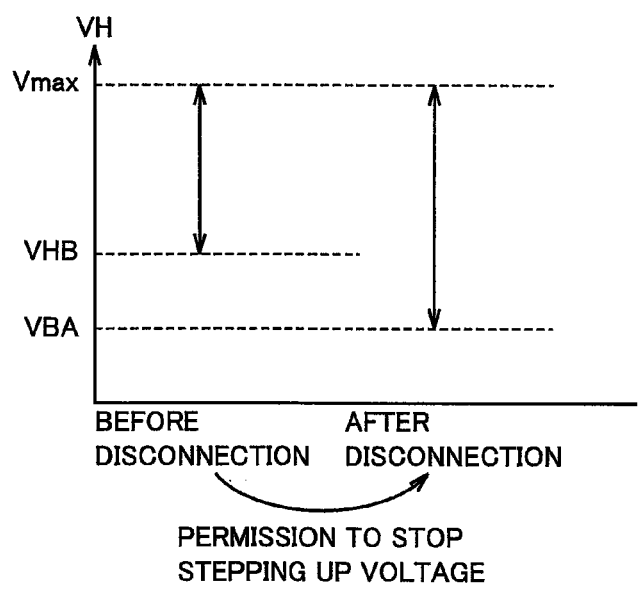
FIG. 11 illustrates a concept of comparing a voltage control range for a power supply line before and after a disconnection process.

Reference will now be made to FIG. 11 to compare a voltage control range for electric power feeding line PL2 before the disconnection process and that for the line after the disconnection process.

With reference to FIG. 11, before the disconnection process, battery BA and a selected sub power storage device BB are electrically connected to electric power feeding line PL2 and accordingly it is necessary to set voltage VH on electric power feeding line PL2 to be higher than any voltage output from battery BA and the selected sub power storage device BB. More specifically, voltage VH is controlled in a range having a lower limit value VHB set to be a voltage higher than a maximum one of at least the voltage output from battery BA and that output from the selected sub power storage device BB, preferably a voltage higher than any of those output from batteries BA, BB1, BB2.

After the disconnection process, in contrast, the sub power storage devices have all been disconnected from the power supply system, and if electric power feeding line PL2 has a voltage decreased to be lower than those output from batteries BB1, BB2, the batteries do not have a short circuit formed therebetween. Thus after the disconnection process converter 12A can be operated in the voltage holding mode to allow VH=VBA.

Again with reference to FIG. 10, control device 30 further proceeds to step S560 to stop a request made to step up voltage in view of the restriction set for the batteries. In other words, in view of the restriction set for the batteries, it is permitted for converter 12A to stop stepping up voltage. As a result, if in view of controlling the motors it is not necessary that converter 12A steps up voltage, converter 12A can be operated in the voltage holding mode to reduce electric power loss.

Figure 12:
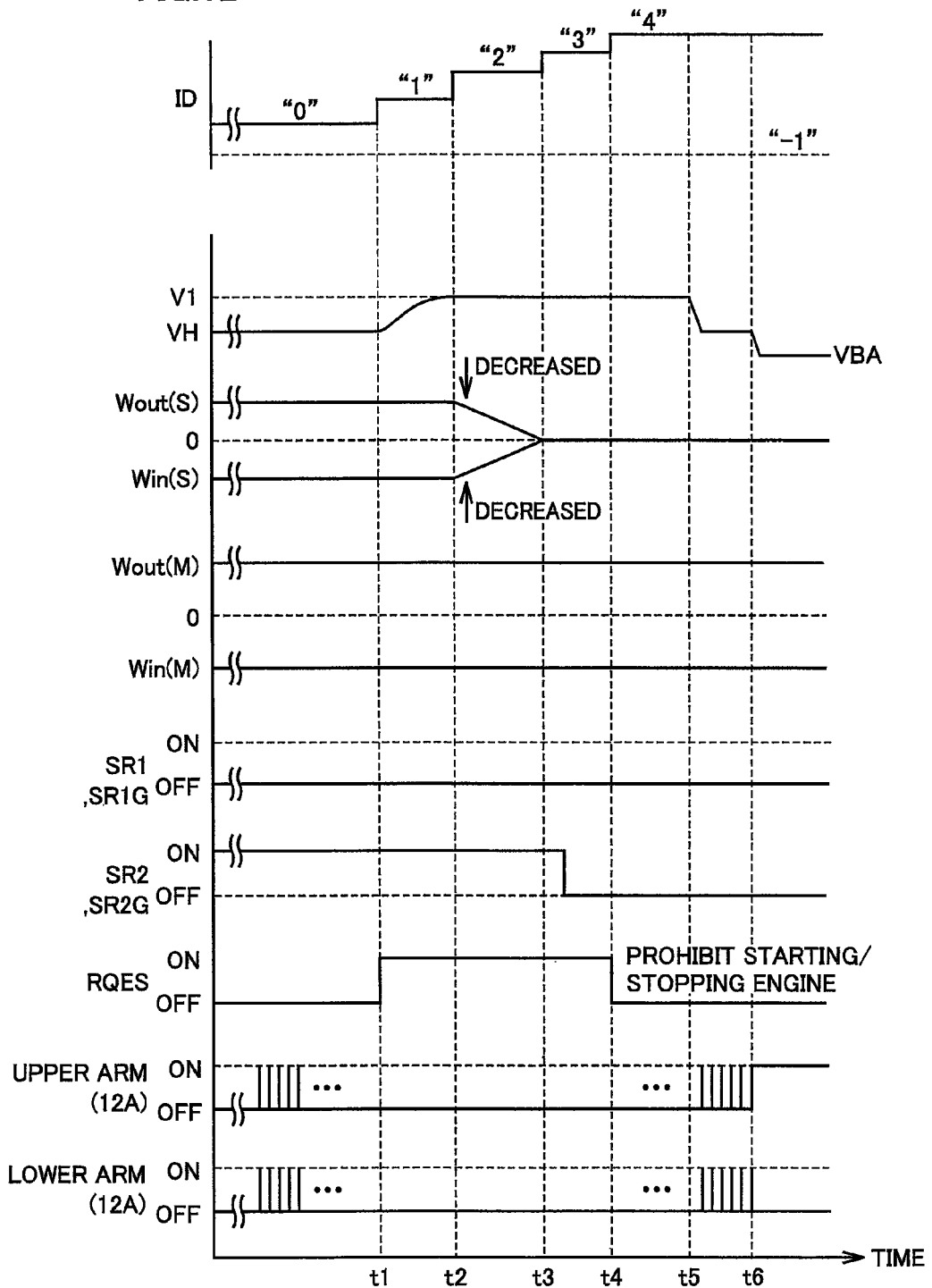
FIG. 12 is a waveform diagram of an operation performed in the process for disconnecting a selected sub power storage device in a hybrid vehicle in an embodiment of the present invention.

FIG. 12 shows in waveform an operation performed in the disconnection process to disconnect a selected sub power storage device in the power supply system of the hybrid vehicle in the embodiment of the present invention described with reference to FIG. 5 to FIG. 10.

With reference to FIG. 12, for ID=0, or up to time t1, the disconnection determination process is performed periodically as predetermined, as based on the SOC of the currently selected sub power storage device that is the last sub power storage device (e.g., battery BB2). Note that if ID=−1 is set from a decision made in starting the power supply system, then, as has been described above, the disconnection determination is substantially not initiated, and the parallel battery mode is held. In other words, the disconnection process to disconnect a sub power storage device will not be performed.

At time t1, in response to battery BB2 decreasing in SOC, the disconnection determination process (step S100) is performed to issue a disconnection request to disconnect the selected sub power storage device BB and ID=1 is also set to start the disconnection process.

Thus the pre-disconnection voltage step up process (step S200) is performed and converter 12A increases voltage VH on electric power feeding line PL2 toward predetermined voltage V1. A process for stepping up voltage on electric power feeding line PL2 is completed at time t2, and accordingly, the ID is changed from 1 to 2.

When ID=2 is set, the electric power limit modification process (S300) is performed to decrease the upper limits on electric power input/output Win(S), Wout(S) to/from the selected sub power storage device BB toward 0 gradually at a fixed rate. Furthermore, converter 12B is controlled to stop charging/discharging the currently selected sub power storage device (battery BB2). Alternatively, converter 12B may be shut down since time t1.

At time t3, the upper limits on electric power input/output Win(S), Wout(S) to/from the selected sub power storage device BB is narrowed down to 0, and in response, the ID is changed from 2 to 3. Once ID=3 is set, disconnecting the sub power storage device starts. More specifically, with converter 12A shutdown, relays SR2, SR2G that have been turned on are turned off, and relays SR1, SR1G are held off. As a result, both batteries BB1 and BB2, i.e., all sub power storage devices are electrically disconnected from the power supply system. By completion of this disconnection operation, the ID is changed from 3 to 4 at time t4.

Once ID=4 is set, a process accompanying the disconnection process and stepping up voltage on electric power feeding line PL2 is also stopped (time t5). This decreases voltage VH from predetermined voltage V1. This completes a series of steps of the disconnection process to disconnect a selected sub power storage device and the single battery mode is applied. As a result, battery BA (the main power storage device) is alone used to start supplying and recovering electric power.

Note that after ID=4 is set, it is not necessary to step up voltage in view of the restriction set for the batteries, as has been described above, and stopping converter 12A from stepping up voltage is permitted. As such, at time t6 when voltage VH on electric power feeding line PL2 is voltage output from battery BA, and despite that motor generators MG1, MG2 become controllable, converter 12A operates in the voltage holding mode. In the voltage holding mode, the upper arm and the lower arm are held on/off, and an electric power loss caused at converter 12A can be reduced.

Furthermore, for an engine start/stop restriction as will be described later, a flag RQES is set on while ID=1-3. Flag RQES is provided for prohibiting an engine stopping process or an engine starting process during the process for disconnecting a selected sub power storage device BB.

Hereinafter reference will be made to FIG. 13 and FIG. 14 to describe a control process for the engine start/stop restriction in a hybrid vehicle in an embodiment of the present invention.

With reference to FIG. 13, control device 30 in step S700 determines from variable ID whether a process is currently performed to disconnect a sub power storage device. More specifically, when ID=1-3 (YES at S700), control device 30 proceeds to step S710 to set flag RQES on. This prohibits further performing (or starting) a process for starting engine 4 and that for stopping it. If ID is not equal to 1-3 (NO at S700), typically if ID=0, 4, then control device 30 proceeds to step S720 to set off flag RQES. This permits further performing (or starting) the process for starting engine 4 and that for stopping it.

FIG. 14 is a flowchart for illustrating the engine start/stop restriction following flag RQES.

With reference to FIG. 14, control device 30 proceeds to step S800 to determine whether there is a stop or start engine request. As has been described above, a stop engine request and a start engine request are generated, as based on a comparison between an upper limit on electric power input/output to/from the power supply system as a whole and total required power Pttl, or in order to protect components, e.g., to prevent engine 4 or motor generator MG1 from rotating at an excessively increased speed when the engine or the motor generator rotates at such speed.

If a request is generated to stop or start engine 4 (YES at S800), control device 30 proceeds to step S810 to determine whether the request has been made to protect a component.

If not (NO at S810), control device 30 further proceeds to step S820 to determine from flag RQES whether the process for starting/stopping the engine should be permitted or prohibited. More specifically, if flag RQES is set on (YES at S820), i.e., when a process is currently performed to disconnect a sub power storage device, control device 30 proceeds to step S830 to prohibit the process for starting/stopping engine 4. In that case, if a request is generated to start or stop engine 4, traveling control unit 250 (FIG. 4) does not generate a start/stop engine command until the disconnection process to disconnect the sub power storage device ends and flag RQES is accordingly set off.

In contrast, if flag RQES is set off (NO at S820), control device 30 proceeds to step S840 and in response to the stop engine request or the start engine request permits starting the process for starting or stopping engine 4.

If the stop engine request or the start engine request is generated to protect a component (YES at S810), then, regardless of flag RQES, i.e., even if a process is currently performed to disconnect a sub power storage device, control device 30 proceeds to step S840 to permit the engine starting process and the engine stopping process. In other words, the stop engine request or the start engine request for protecting a component is preferentially permitted.

Note that refraining the engine stopping process or the engine starting process as the disconnection process is currently performed (i.e., RQES is set on), may be provided with a time guard. For example, since the stop engine request or the start engine request was generated a period of time exceeding a predetermined period of time has elapsed, and if despite that, starting/stopping the engine is still not permitted, then, similarly as done for YES at step S810, a flow that proceeds to step S840 can be added to ensure that a start/stop engine command is generated after the predetermined period of time has elapsed.

Figure 15:
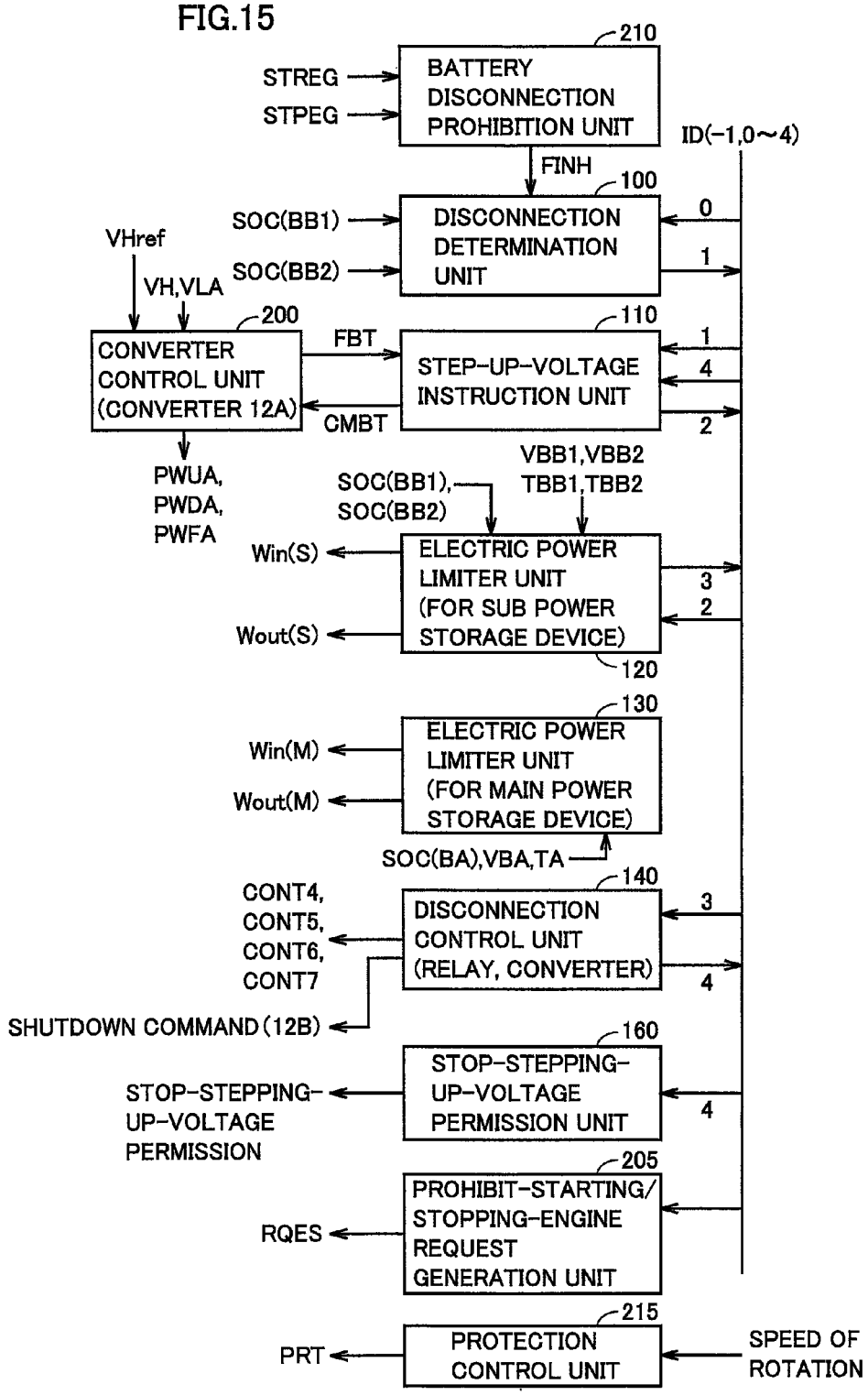
FIG. 15 is a functional block diagram for illustrating a functional portion in a configuration controlling a hybrid vehicle in an embodiment of the present invention, that is provided for the process for disconnecting a selected sub power storage device, and restricting starting/stopping the engine.

FIG. 15 is a functional block diagram for illustrating a function in a configuration controlling a hybrid vehicle in an embodiment of the present invention, that is provided for the process for disconnecting a selected sub power storage device, and the engine start/stop restriction. FIG. 15 shows function blocks, which are implemented as control device 30 executing a predetermined program to provide software processing, or by dedicated electronic circuitry (or hardware processing).

With reference to FIG. 15, a disconnection determination unit 100 receives SOC(BB1), SOC(BB2) indicating the states of charge respectively of batteries BB1, BB2. If there is no available sub power storage device left and the last one is used as the selected sub power storage device BB, disconnection determination unit 100 determines whether the selected sub power storage device BB currently used has an SOC decreased to be lower than a predetermined reference value.

Disconnection determination unit 100 performs the determination process periodically, as predetermined, when variable ID shared by each function block is 0, and when it is necessary to disconnect a selected sub power storage device, the ID is changed from 0 to 1. Thus a request is generated to disconnect the selected sub power storage device. In other words, disconnection determination unit 100 has a function corresponding to the FIG. 6 steps S107, S110.

A battery disconnection prohibition unit 210 operates in response to flag STPEG indicating that the engine stopping process is currently performed and flag STREG indicating that the engine starting process is currently performed to output a flag FINH during the engine starting process and the engine stopping process to disconnection determination unit 100 to prohibit generating the disconnection request. More specifically, when one of flags STREG, STPEG is set on, prohibition flag FINH is set on, and when flags STREG, STPEG are both set off, prohibition flag FINH is set off.

When prohibition flag FINH is set on, disconnection determination unit 100 holds ID=0 regardless of the SOC of the last selected sub power storage device BB. In other words, battery disconnection prohibition unit 210 has a function corresponding to the FIG. 6 step S120.

When a request is generated to disconnect the selected sub power storage device and ID=1 is set, a step-up-voltage instruction unit 110 outputs a step up voltage command signal CMBT to a converter control unit 200 controlling converter 12A.

Converter control unit 200 generates control signals PWUA, PWDA for converter 12A, as based on voltages VH, VLA and voltage command value VHref, so that voltage VH on electric power feeding line PL2 reaches voltage command value VHref.

Furthermore, when step-up-voltage instruction unit 110 generates step up voltage command signal CMBT, converter control unit 200 sets voltage command value VHref=V1 and generates control signal PWUA, and if voltage sensor 13 senses voltage VH having reached predetermined voltage V1 continuously for at least a predetermined period of time, converter control unit 200 sets on a flag FBT indicating that stepping up voltage is completed.

In response to flag FBT set on, step-up-voltage instruction unit 110 sets ID=2, and continues to output step up voltage command signal CMBT until a disconnection control unit 140, which will be described later, completes turning off all relays and accordingly ID=4 is set. In other words, step-up-voltage instruction unit 110 has a function corresponding to the FIG. 5 step S200 and the FIG. 10 step S550.

An electric power limiter unit 120 sets the upper limits on electric power input/output Win(S), Wout(S) to/from the selected sub power storage device BB. Normally, the upper limits on electric power input/output Win(S), Wout(S) are set based on the selected sub power storage device BB or battery's SOC (SOC(BB1) or SOC (BB2)), temperature (TBB1 or TBB2), and output voltage (VB1 or VB2).

In the disconnection process to disconnect the selected sub power storage device, in contrast, when ID=2 is set, electric power limiter unit 120 decreases the upper limits on electric power input/output Win(S), Wout(S) gradually at a fixed rate toward 0, and when Win(S), Wout(S) have reached 0, electric power limiter unit 120 changes the ID from 2 to 3.

In other words, electric power limiter unit 120 implements the FIG. 8 steps S320, S330 and a function of an "electric power limiter unit" of the present invention.

An electric power limiter unit 130 sets the upper limits on electric power input/output Win(M) and Wout(M) to/from main power storage device BA. The upper limits on electric power input/output Win(M), Wout(M) are set based on main power storage device BA's SOC(BA), temperature TA, and output voltage VA. Note that the upper limits on electric power input/output Win(M) and Wout(M) while the disconnection process is performed are also set similarly as they are for the period other than the disconnection process.

When electric power limiter unit 120 sets ID=3, disconnection control unit 140 in response generates a command to shut down converter 12B. Furthermore, disconnection control unit 140 generates relay control signals CONT4-CONT7 to turn relays SR1, SR1G, SR2, SR2G all off. Once this disconnection operation (or turning off all relays) has been completed, the ID is changed from 3 to 4. Disconnection control unit 140 corresponds to the FIG. 5 step S400. The ID set to 4 completes shifting to the single battery mode.

When disconnection control unit 140 sets ID=4, a stop-stepping-up-voltage permission unit 160 in response generates a permission for converter 12A to stop stepping up voltage. Voltage command value VHref is thus not increased in view of the restriction on the battery and will be set with only the states respectively of motor generators MG1, MG2 reflected therein. As a result, as shown in FIG. 11, converter 12A can be operated in the voltage holding mode allowing reduced electric power loss.

A prohibit-starting/stopping-engine request generation unit 205 operates for ID=1-3 to set on flag RQES, and otherwise sets off flag RQES. In other words, prohibit-starting/stopping-engine request generation unit 205 has a function corresponding to the FIG. 13 steps S700-S720.

A protection control unit 215 operates based on the speed of rotation of a rotary element (e.g., motor generator MG1, engine 4 and the like) coupled to power split device 3 to generate a start/stop engine request (not shown) for protecting a component and also set on a flag PRT indicating that the request is a start/stop engine request for protecting a component.

In other words, the FIG. 14 steps S810-S840 can be performed by traveling control unit 250 (FIG. 4) based on flags PRT, RQES.

As described above, the present invention in an embodiment provides a hybrid vehicle and a method for controlling the same, that can prohibit an internal combustion engine from starting and stopping while a disconnection process to disconnect a sub power storage device is performed, and that can also prohibit a disconnection process to disconnect a sub power storage device while a process is performed for starting or stopping the internal combustion engine. This can prevent power that can be output to drive a vehicle from varying during a process for disconnecting a sub power storage device as an engine starting/stopping process is performed and electric power is accordingly input/output.

Thus when a power supply system for a hybrid vehicle with a single voltage converter (a converter) shared by a plurality of sub power storage devices has the last sub power storage device exhausted and accordingly shifts to the single battery mode (or a disconnection process is performed), the power supply system can do so without the disconnection process negatively affecting the vehicle's drivability.

Furthermore, in the process for disconnecting a sub power storage device that is used, the voltage on electric power feeding line PL2 is first increased and thereafter the sub power storage device is disconnected. This ensures that the disconnection process is performed without forming a short circuit in the system between power storage devices (or batteries). Furthermore, in the process for disconnecting a selected sub power storage device, a selected sub power storage device BB has its upper limits on electric power input/output Win(S), Wout(S) gradually decreased and thereafter a disconnection operation is actually performed. This can prevent the power supply system from being requested to excessively charge/discharge.

Furthermore, shifting to the single battery mode allows converter 12A to operate in the voltage holding mode. Reduced electric power loss and hence improved fuel-efficiency of hybrid vehicle 1 can be accomplished.

It should be understood that the embodiments disclosed herein are illustrative and non-restrictive in any respect. The scope of the present invention is defined by the terms of the claims, rather than the description above, and is intended to include any modifications within the scope and meaning equivalent to the teems of the claims.

Industrial Applicability

The present invention is applicable to hybrid vehicles having mounted therein a main power storage device and a plurality of sub power storage devices.

Reference Signs List 1 hybrid vehicle, 2 wheel, 3 power split device, 4 engine, 6 battery charging converter (external charging), 8 external power supply, 9A, 9B1, 9B2 current sensor, 10A, 10B1, 10B2, 13, 21A, 21B voltage sensor, 11A, 11B1, 11B2 temperature sensor, 12A converter (dedicated to main power storage device), 12B converter (shared by sub power storage devices), 14, 22 inverter, 15-17 each phase arm (U, V, W), 24, 25 current sensor, 30 control device, 39A connection unit (for main power storage device), 39B connection unit (for sub power storage device), 100 disconnection determination unit, 110 step-up-voltage instruction unit, 120 electric power limiter unit (for sub power storage device), 130 electric power limiter unit (for main power storage device), 140 disconnection control unit, 160 stop-stepping-up-voltage permission unit, 200 converter control unit, 205 prohibit-starting/stopping-engine request generation unit, 210 battery disconnection prohibition unit, 215 protection control unit, 250 traveling control unit, 260 total power calculation unit, 270, 280 inverter control unit, BA battery (main power storage device), BB selected sub power storage device, BB1, BB2 battery (sub power storage device), C1, C2, CH smoothing capacitor, CMBT step up voltage command signal, CONT1-CONT7 relay control signal, D1-D8 diode, FBT flag (stepping up voltage completed), F1NH prohibition flag (process for switching sub power storage device), IA, TB1, IB2 input/output current (battery), ID variable (status of disconnection process), IGON start signal, L1 reactor, MCRT1, MCRT2 motor current value, MG1, MG2 motor generator, PL1A, PL1B power supply line, PL2 electric power feeding line, Pttl total required power, PRT flag (for protecting component), PWMI, PWMI1, PWMI2, PWMC, PWMC1, PWMC2 control signal (for inverter), PWF, PWFA, PWFB, PWU, PWUA, PWDA, PWD, PWDA, PWDB control signal (for converter), RQES flag (to prohibit engine starting/stopping process), Q1-Q8 IGBT device, R limiting resistor, SL1, SL2 ground line, SMR1-SMR3 system main relay, SR1, SR1G, SR2, SR2G relay, STPEG flag (while engine stopping process is performed), STREG flag (while engine starting process is performed), TA, TBB1, TBB2 battery temperature (battery), Tqcom1, Tqcom2 torque command value, UL, VL, WL line (3 phase), V1 predetermined voltage, VBA, VBB1, VBB2 voltage (battery output voltage), VHA lower limit value for VH control range, VLA, VLB, VH voltage, VHref voltage command value (VH), Win upper limit on electric power input, Win(M) upper limit on electric power input (to main power storage device), Win(S) upper limit on electric power input (to selected sub power storage device), Wout upper limit on electric power output, Wout(M) upper limit on electric power output (from main power storage device), Wout(S) upper limit on electric power output (from selected sub power storage device)

The invention claimed is:

1. A hybrid vehicle comprising
a motor generating power to drive the vehicle;
an internal combustion engine configured to be capable of outputting power to drive the vehicle independently of said motor;
a main power storage device;
an electric power feeding line supplying electric power to an inverter that controls and drives said motor;
a first voltage converter provided between said electric power feeding line and said main power storage device and configured to convert voltage therebetween bidirectionally;
a plurality of sub power storage devices provided in parallel to each other;
a second voltage converter provided between said plurality of sub power storage devices and said electric power feeding line and configured to convert voltage between one of said plurality of sub power storage devices and said electric power feeding line bidirectionally;
a connection unit provided between said plurality of sub power storage devices and said second voltage converter and configured to control connection and disconnection between said plurality of sub power storage devices and said second voltage converter;
a control device operative in a first mode for controlling said connection unit to connect a selected sub power storage device selected sequentially from said plurality of sub power storage devices to said second voltage converter and also disconnect the sub power storage devices other than said selected sub power storage device from said second voltage converter, and operative in a second mode for controlling said connection unit to disconnect each of said plurality of sub power storage devices from said second voltage converter; and
a traveling control unit dividing and thus assigning a total required power for the hybrid vehicle to power output from said motor and power output from said internal combustion engine, wherein said traveling control unit prohibits starting and stopping of the internal combustion engine during the process of disconnecting a last-used sub power storage in shifting from the first mode to the second mode.

2. The hybrid vehicle according to claim 1, further comprising
a rotary element configured to have a speed of rotation varying as an output from said internal combustion engine varies; and
a protection control unit generating one of a request to start said internal combustion engine and a request to stop said internal combustion engine to prevent said rotary element from excessive rotation,
wherein said traveling control unit permits one of said process performed for starting said internal combustion engine and said process performed for stopping said internal combustion engine, regardless of whether said disconnection process is currently performed, when said protection control unit generates one of said request to start said internal combustion engine and said request to stop said internal combustion engine.

3. The hybrid vehicle according to claim 1, wherein said control device includes
a disconnection determination unit configured to generate a disconnection request requesting that said disconnection process be started, as based on a state of charge of a residual capacity of said selected sub power storage device currently used, in said first mode when there is no remaining sub power storage device allowed to be exchanged with said selected sub power storage device currently used; and
a disconnection prohibition unit configured to instruct said disconnection determination unit to avoid generating said disconnection request when one of said process performed for starting said internal combustion engine and said process performed for stopping said internal combustion engine is performed.

4. The hybrid vehicle according to claim 1, wherein said control device further includes a stop-stepping-up-voltage permission unit configured to decrease a lower limit value of a voltage control range for said electric power feeding line in said second mode to be smaller than said lower limit value in said first mode to set said lower limit value at a voltage output from said main power storage device.

5. A hybrid vehicle comprising
a motor generating power to drive the vehicle;
an internal combustion engine configured to be capable of outputting power to drive the vehicle independently of said motor;
a main power storage device;
an electric power feeding line supplying electric power to an inverter that controls and drives said motor;
a first voltage converter provided between said electric power feeding line and said main power storage device and configured to convert voltage therebetween bidirectionally;
a plurality of sub power storage devices provided in parallel to each other;
a second voltage converter provided between said plurality of sub power storage devices and said electric power feeding line and configured to convert voltage between one of said plurality of sub power storage devices and said electric power feeding line bidirectionally;
a connection unit provided between said plurality of sub power storage devices and said second voltage converter and configured to control connection and disconnection between said plurality of sub power storage devices and said second voltage converter; and
a control device operative in a first mode for controlling said connection unit to connect a selected sub power storage device selected sequentially from said plurality of sub power storage devices to said second voltage converter and also disconnect said sub power storage devices other than said selected sub power storage device from said second voltage converter, and operative in a second mode for controlling said connection unit to disconnect each of said plurality of sub power storage devices from said second voltage converter, wherein said control device includes a disconnection determination unit configured to generate a disconnection request indicating that said first mode be shifted to said second mode, as based on a state of charge of a residual capacity of said selected sub power storage device currently used, in said first mode when there is no remaining sub power storage device allowed to be exchanged with said selected sub power storage device currently used; and a disconnection prohibition unit configured to instruct said disconnection determination unit to avoid generating said disconnection request when starting or stopping of the internal combustion engine is being performed.

6. The hybrid vehicle according to claim 5, wherein said control device further includes a step-up-voltage instruction unit configured to instruct said first voltage converter to provide a voltage on said electric power feeding line to be a first voltage higher than at least voltages output from said main power storage device and said plurality of sub power storage devices, respectively, when said disconnection request is generated;

an electric power limiter unit configured to decrease a value of an upper limit on electric power input/output to/from said selected sub power storage device gradually to zero after said voltage on said electric power feeding line has reached said first voltage;

a disconnection control unit instructing said connection unit to disconnect said selected sub power storage device from said second voltage converter and also hold the sub power storage devices other than said selected sub power storage device disconnected from said second voltage converter when said electric power limiter unit sets at zero said value of said upper limit on electric power input/output; and a stop-stepping-up-voltage permission unit configured to decrease a lower limit value of a voltage control range for said electric power feeding line to be smaller than said lower limit value in said first mode to set said lower limit value at a voltage output from said main power storage device after said disconnection control unit disconnects each said sub power storage device from said second voltage converter.

7. A method for controlling a hybrid vehicle including a motor generating power to drive said vehicle;

an internal combustion engine configured to be capable of outputting power to drive said vehicle independently of said motor;

a main power storage device;

an electric power feeding line supplying electric power to an inverter that controls and drives said motor;

a first voltage converter provided between said electric power feeding line and said main power storage device and configured to convert voltage therebetween bidirectionally;

a plurality of sub power storage devices provided in parallel to each other;

a second voltage converter provided between said plurality of sub power storage devices and said electric power feeding line and configured to convert voltage between one of said plurality of sub power storage devices and said electric power feeding line bidirectionally;

a connection unit provided between said plurality of sub power storage devices and said second voltage converter and configured to control connection and disconnection between said plurality of sub power storage devices and said second voltage converter;

a control device operative in a first mode for controlling said connection unit to connect a selected sub power storage device selected sequentially from said plurality of sub power storage devices to said second voltage converter and also disconnect said sub power storage devices other than said selected sub power storage device from said second voltage converter, and operative in a second mode for controlling said connection unit to disconnect each of said plurality of sub power storage devices from said second voltage converter; and a traveling control unit dividing and thus assigning a total required power for said hybrid vehicle to power output from said motor and power output from said internal combustion engine, the method comprising the steps of determining with the control device whether a disconnection process is currently performed to disconnect a last-used sub power storage device from said second voltage converter to shift from said first mode to said second mode; and prohibiting with the control device, in said disconnection process, starting or stopping of the internal combustion engine.

8. The method for controlling a hybrid vehicle according to claim 7, said hybrid vehicle further including a rotary element configured to have a speed of rotation varying as an output from said internal combustion engine varies, and a protection control unit generating one of a request to start said internal combustion engine and a request to stop said internal combustion engine to prevent said rotary element from excessive rotation, the method further comprising the step of permitting with the control device one of said process performed for starting said internal combustion engine and said process performed for stopping said internal combustion engine, regardless of whether said disconnection process is currently performed, when said protection control unit generates one of said request to start said internal combustion engine and said request to stop said internal combustion engine.

9. The method for controlling a hybrid vehicle according to claim 7, further comprising the steps of generating with the control device a disconnection request requesting that said disconnection process be started, as based on a state of charge of a residual capacity of said selected sub power storage device currently used, in said first mode when there is no remaining sub power storage device allowed to be exchanged with said selected sub power storage device currently used; and providing an instruction with the control device to avoid generating said disconnection request, regardless of said state of charge of said selected sub power storage device, when one of said process performed for starting said internal combustion engine and said process performed for stopping said internal combustion engine is performed.

10. A method for controlling a hybrid vehicle according to claim 7, further comprising the step of decreasing with the control device a lower limit value of a voltage control range for said electric power feeding line in said second mode to be smaller than said lower limit value in said first mode to set said lower limit value at a voltage output from said main power storage device.

11. A method for controlling a hybrid vehicle including a motor generating power to drive said vehicle;

an internal combustion engine configured to be capable of outputting power to drive said vehicle independently of said motor;

a main power storage device;

an electric power feeding line supplying electric power to an inverter that controls and drives said motor;

a first voltage converter provided between said electric power feeding line and said main power storage device and configured to convert voltage therebetween bidirectionally;

a plurality of sub power storage devices provided in parallel to each other;

a second voltage converter provided between said plurality of sub power storage devices and said electric power feeding line and configured to convert voltage between one of said plurality of sub power storage devices and said electric power feeding line bidirectionally;

a connection unit provided between said plurality of sub power storage devices and said second voltage converter and configured to control connection and disconnection between said plurality of sub power storage devices and said second voltage converter; and a control device operative in a first mode for controlling said connection unit to connect a selected sub power storage device selected sequentially from said plurality of sub power storage devices to said second voltage converter and also disconnect said sub power storage devices other than said selected sub power storage device from said second voltage converter, and operative in a second mode for controlling said connection unit to disconnect each of said plurality of sub power storage devices from said second voltage converter, the method comprising the steps of generating with the control device a disconnection request indicating that said first mode be shifted to said second mode, as based on a state of charge of a residual capacity of said selected sub power storage device currently used, in said first mode when there is no remaining sub power storage device allowed to be exchanged with said selected sub power storage device currently used; and providing with the control device an instruction to avoid generating said disconnection request, regardless of said state of charge of said selected sub power storage device, when starting or stopping of the internal combustion engine is being performed.

12. The method for controlling a hybrid vehicle according to claim 11, further comprising the steps of instructing with the control device said first voltage converter to provide a voltage on said electric power feeding line to be a first voltage higher than at least voltages output from said main power storage device and said plurality of sub power storage devices, respectively, when said disconnection request is generated;

decreasing a value of an upper limit on electric power input/output to/from said selected sub power storage device gradually to zero with the control device after said voltage on said electric power feeding line has reached said first voltage;

instructing with the control device said connection unit to disconnect said selected sub power storage device from said second voltage converter and also hold the sub power storage devices other than said selected sub power storage device disconnected from said second voltage converter when the step of decreasing sets at zero said value of said upper limit on electric power input/output; and decreasing with the control device a lower limit value of a voltage control range for said electric power feeding line to be smaller than said lower limit value in said first mode to set said lower limit value at a voltage output from said main power storage device after the step of instructing disconnects each said sub power storage device from said second voltage converter.

* * * * *